(12) United States Patent
Kim et al.

(10) Patent No.: US 11,567,612 B2
(45) Date of Patent: Jan. 31, 2023

(54) INPUT SENSING CIRCUIT AND DISPLAY MODULE HAVING THE SAME

(71) Applicant: Samsung Display Co., Ltd., Yongin-si (KR)

(72) Inventors: Miyoung Kim, Hwaseong-si (KR); Janghui Kim, Suwon-si (KR); ChangBum Kim, Pyeongtaek-Si (KR); Jungmok Park, Hwaseong-si (KR); ByeongKyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/842,822

(22) Filed: Jun. 17, 2022

(65) Prior Publication Data

US 2022/0391031 A1  Dec. 8, 2022

Related U.S. Application Data

(63) Continuation of application No. 17/383,699, filed on Jul. 23, 2021, now Pat. No. 11,366,555, which is a
(Continued)

(30) Foreign Application Priority Data

Nov. 14, 2018 (KR) ........................ 10-2018-0140141

(51) Int. Cl.
G06F 3/044 (2006.01)
G06F 3/01 (2006.01)
(Continued)

(52) U.S. Cl.
CPC .............. *G06F 3/044* (2013.01); *G06F 3/016* (2013.01); *G06F 3/0416* (2013.01); *G06F 3/0488* (2013.01); *G06F 2203/04106* (2013.01)

(58) Field of Classification Search
CPC ...... G06F 3/044; G06F 3/0416; G06F 3/0488; G06F 2203/04106
See application file for complete search history.

(56) References Cited

U.S. PATENT DOCUMENTS 5,854,625 A   12/1998   Frisch et al.
9,297,831 B2   3/2016   Ahn et al.
(Continued)

FOREIGN PATENT DOCUMENTS

CN    108595055    9/2018
KR    10-1998-0042097    8/1998
(Continued)

OTHER PUBLICATIONS

Notice of Allowance dated Apr. 2, 2021, issue in U.S. Appl. No. 16/683,250.
(Continued)

*Primary Examiner* — Sejoon Ahn
(74) *Attorney, Agent, or Firm* — H.C. Park & Associates, PLC

(57) ABSTRACT

A display module includes: a display panel; and an input sensing circuit disposed thereon, the input sensing circuit including: a first sensor group including a plurality of first sensors arranged in a first direction; a plurality of first connection portions electrically connecting two adjacent first sensors of the plurality of first sensors, respectively; a second sensor group including a plurality of second sensors arranged in a second direction crossing the first direction; a plurality of second connection portions electrically connecting two adjacent second sensors of the plurality of second sensors, respectively; a first signal line electrically connected to one first sensor of the plurality of first sensors; a first measuring line electrically connected to the one first sensor among the plurality of first sensors and spaced apart from the first signal line; and a second measuring line
(Continued)

electrically connected to another first sensor among the plurality of first sensors.

13 Claims, 18 Drawing Sheets

Related U.S. Application Data continuation of application No. 16/683,250, filed on Nov. 13, 2019, now Pat. No. 11,079,883.

(51) Int. Cl.
*G06F 3/041* (2006.01)
*G06F 3/0488* (2022.01)

(56) References Cited

U.S. PATENT DOCUMENTS

| | | |
|---|---|---|
| 10,139,974 B2 | 11/2018 | Hong et al. |
| 10,175,783 B2 | 1/2019 | Lee |
| 10,783,713 B2 | 9/2020 | Murali et al. |
| 10,785,365 B2 | 9/2020 | Rodriguez et al. |
| 10,785,441 B2 | 9/2020 | Candelore et al. |
| 2010/0128002 A1 | 5/2010 | Stacy et al. |
| 2016/0147352 A1 | 5/2016 | Filiz et al. |
| 2017/0160830 A1 | 6/2017 | Lee |
| 2017/0285799 A1 | 10/2017 | Iuchi et al. |
| 2017/0364230 A1 | 12/2017 | Kim et al. |
| 2018/0039373 A1 | 2/2018 | Katsuta |
| 2018/0059837 A1 | 3/2018 | Kim et al. |
| 2018/0129330 A1 | 5/2018 | Ding et al. |
| 2018/0308903 A1 | 10/2018 | Jeong et al. |
| 2019/0339817 A1 | 11/2019 | Kim et al. |
| 2020/0005690 A1* | 1/2020 | Gottsov ............... G09G 3/3406 |
| 2020/0007752 A1* | 1/2020 | Yoshida ............... G06F 3/0482 |
| 2020/0241706 A1 | 7/2020 | Li |

FOREIGN PATENT DOCUMENTS

| | | |
|---|---|---|
| KR | 10-1459307 | 11/2014 |
| KR | 10-2017-0065695 | 6/2017 |
| KR | 10-2017-0133567 | 12/2017 |
| KR | 10-2017-0140460 | 12/2017 |
| KR | 10-2018-0000042 | 1/2018 |
| KR | 10-2018-0000665 | 1/2018 |
| KR | 10-2018-0025389 | 3/2018 |
| KR | 10-1870834 | 6/2018 |
| KR | 10-2019-0126953 | 11/2019 |

OTHER PUBLICATIONS

Extended European Search Report dated Mar. 20, 2020, issued in European Patent Application No. 19208605.6.
Examination Report dated Feb. 3, 2022, in European Patent Application No. 19208605.6.
Haoting Sun et al., The resistance temperature stability of ITO film strain gauge: detailed investigate the influence mechanism of (100) preferred orientation of ITO film, 2019, Journal of Materials Science: Materials in Electronics.
Otto J. Gregory et al., Nanocomposite Thin Film Strain Gages with Low TCR, vol. 1024, 2007, MRS Online Proceedings Library.
Notice of Allowance dated Feb. 18, 2022, in U.S. Appl. No. 17/383,699.

* cited by examiner

INPUT SENSING CIRCUIT AND DISPLAY MODULE HAVING THE SAME

CROSS-REFERENCE TO RELATED APPLICATION

This application is a Continuation of U.S. patent application Ser. No. 17/383,699, filed on Jul. 23, 2021, which is a Continuation of U.S. patent application Ser. No. 16/683,250, filed on Nov. 13, 2019, now U.S. Pat. No. 11,079,883, and claims priority from and the benefit of Korean Patent Application No. 10-2018-0140141, filed on Nov. 14, 2018, each of which is hereby incorporated by reference for all purposes as if fully set forth herein.

BACKGROUND

Field

Embodiments/implementations of the invention relate generally to an input sensing circuit that senses a user's touch and a pressure applied thereto and a display module having the input sensing circuit.

Discussion of the Background

Various display devices, which are applied to a multimedia device, such as a television set, a mobile phone, a tablet computer, a navigation unit, and a game unit, have been developed. The display devices include a keyboard or a mouse as their input device.

In recent years, the display devices have included an input sensing circuit as their input device to sense a user's touch or a pressure applied thereto from the user.

The display devices recognize a user's finger that makes contact with a screen thereof through the input sensing circuit. The input sensing circuit senses the user's touch by using various methods, such as a resistive overlay method, an optical overlay method, a capacitive overlay method, or an ultrasonic method. Among them, the capacitive overlay method detects whether the user's touch occurs using a capacitance that varies when a touch generating member makes contact with the screen of the display device.

The above information disclosed in this Background section is only for understanding of the background of the inventive concepts, and, therefore, it may contain information that does not constitute prior art.

SUMMARY

Devices constructed according to exemplary implementations of the invention provide an input sensing circuit capable of sensing a user's touch and a pressure applied thereto, and a display module including the input sensing circuit.

Additional features of the inventive concepts will be set forth in the description which follows, and in part will be apparent from the description, or may be learned by practice of the inventive concepts.

According to one or more embodiments of the invention, a display module including a display panel and an input sensing circuit disposed on the display panel. The input sensing circuit includes a first sensor group including a plurality of first sensors arranged in a first direction, a plurality of first connection portions electrically connecting two adjacent first sensors of the plurality of first sensors, respectively, a second sensor group including a plurality of second sensors arranged in a second direction crossing the first direction, a plurality of second connection portions electrically connecting two adjacent second sensors of the plurality of second sensors, respectively, a first signal line electrically connected to one first sensor of the plurality of first sensors, a first measuring line electrically connected to the one first sensor among the plurality of first sensors and spaced apart from the first signal line, and a second measuring line electrically connected to another first sensor among the plurality of first sensors.

The one first sensor among the plurality of first sensors may include a body portion, a first junction portion protruded from the body portion in a direction substantially parallel to the first direction and connected to the first signal line, and a second junction portion protruded from the body portion in the direction substantially parallel to the first direction and connected to the first measuring line.

A first length of the first junction portion in the first direction may be different from a second length of the second junction portion in the first direction. The second length may be longer than the first length.

A third length of the first junction portion in the second direction may be equal to or greater than a fourth length of the second junction portion in the second direction and equal to or smaller than four times the fourth length.

The input sensing circuit may further include an insulating layer that covers the plurality of first sensors, the plurality of second sensors, and the first connection portions. At least a portion of each of the second connection portions may be disposed on the insulating layer. The one first sensor of the plurality of first sensors may include a body portion and a first junction portion protruded from the body portion in the first direction and connected to the first signal line.

The input sensing circuit may further include a second junction portion disposed on the insulating layer, overlapped with the first junction portion, and connected to the one first sensor of the plurality of first sensors and the first measuring line.

A plurality of first contact holes and a second contact hole may be defined through the insulating layer, the second connection portions may be connected to the plurality of second sensors through the first contact holes, and the second junction portion may be connected to the one first sensor of the plurality of first sensors through the second contact hole.

The input sensing circuit further may include a second signal line electrically connected to one second sensor among the plurality of second sensors.

The input sensing circuit may further include an input sensing driver electrically connected to the first signal line, the second signal line, the first measuring line, and the second measuring line.

The input sensing driver may be configured to sense a resistance change value of the first measuring line, the plurality of first sensors, and the second measuring line during a first period.

The input sensing driver may be configured to sense a capacitance value formed by the plurality of first sensors and the plurality of second sensors during a second period, the second period being different from the first period.

The first sensor group may include a plurality of the first sensor groups, and the input sensing driver may be configured to compare a resistance change value of one first sensor group among the plurality of first sensor groups with a resistance change value of another first sensor group among the plurality of first sensor groups, the one first sensor group and the another first sensor group being adjacent to each other.

The display module may further include an adhesive member disposed between the display panel and the input sensing circuit, the adhesive member having a predetermined elasticity.

The one first sensor among the plurality of first sensors may be disposed at one distal end of the first sensor group in the first direction, and the another first sensor among the plurality of first sensors may be disposed at an opposing distal end of the first sensor group in the first direction.

According to one or more embodiments of the invention, an input sensing circuit includes a base layer, a plurality of plurality of first sensors, a plurality of first connection portions, a plurality of plurality of second sensors, a plurality of second connection portions, a first signal line, a first measuring line, and a second measuring line. The plurality of first sensors are disposed on the base layer and arranged in a first direction. The first connection portions are disposed on the base layer, and each of the first connection portions electrically connects two adjacent first sensors of the plurality of first sensors, respectively. The plurality of second sensors are disposed on the base layer and arranged in a second direction crossing the first direction. The insulating layer is disposed on the base layer, covers the plurality of first sensors, the first connection portions, and the plurality of second sensors, the insulating layer including a plurality of contact holes defined therethrough. The plurality of second connection portions are disposed on the insulating layer, and electrically connecting two plurality of second sensors of the plurality of second sensors through at least one of the contact holes, respectively. The first signal line may be disposed on the base layer and electrically connected to one first sensor of the plurality of first sensors. The first measuring line is disposed on the base layer and electrically connected to the one first sensor among the plurality of first sensors. The second measuring line is disposed on the base layer and electrically connected to another first sensor among the plurality of first sensors.

The one first sensor among the plurality of first sensors may include: a body portion; a first junction portion protruded from the body portion in a direction substantially parallel to the first direction and connected to the first signal line; and a second junction portion protruded from the body portion in the direction substantially parallel to the first direction and connected to the first measuring line.

A first length of the first junction portion in the first direction may be smaller than a second length of the second junction portion in the first direction.

A third length of the first junction portion in the second direction may be equal to or greater than a fourth length of the second junction portion in the second direction and equal to or smaller than four times the fourth length.

The one first sensor among the plurality of first sensors may include a body portion and a first junction portion protruded from the body portion in a direction substantially parallel to the first direction and connected to the first signal line.

The input sensing circuit may further include a second junction portion disposed on the insulating layer, overlapped with the first junction portion, connected to the one first sensor among the plurality of first sensors through other contact holes of the contact holes, and connected to the first measuring line.

The input sensing circuit may further include a second signal line disposed on the base layer and electrically connected to one second sensor among the plurality of second sensors.

The input sensing circuit may further include an input sensing driver electrically connected to the first signal line, the second signal line, the first measuring line, and the second measuring line.

The input sensing driver may be configured to sense a resistance change value of the first measuring line, the plurality of first sensors, and the second measuring line during a first period.

The input sensing driver may be configured to sense a capacitance value formed by the plurality of first sensors and the plurality of second sensors during a second period different from the first period.

The first sensor group may include a plurality of the first sensor groups, and the input sensing driver is configured to compare a resistance change value of one first sensor group among the plurality of first sensor groups with a resistance change value of another first sensor group among the plurality of first sensor groups, the one first sensor group and the another first sensor group being adjacent to each other.

According to one or more Embodiments of the invention, a display module includes a display panel; and an input sensing circuit disposed on the display panel, the input sensing circuit including: a first sensor group comprising a plurality of first sensors arranged in a first direction wherein the first sensor group comprises a first raw-first sensor group and a second raw-first sensor group disposed on the first raw-first sensor group in a second direction intersecting the first direction, and being adjacent to the first raw-first sensor group; a plurality of first connection portions electrically connecting two adjacent first sensors of the plurality of first sensors, respectively; a second sensor group comprising a plurality of second sensors arranged in the second direction; a plurality of second connection portions electrically connecting two adjacent second sensors of the plurality of second sensors, respectively; a first signal line electrically connected to one first sensor among the plurality of first sensors of the second raw-first sensor group; a first measuring line electrically connected to the one first sensor among the plurality of first sensors of the second raw-first sensor group and spaced apart from the first signal line; a second measuring line electrically connected to another first sensor among the plurality of first sensors of the second raw-first sensor group; a third measuring line electrically connected to one first sensor among the plurality of first sensors of the first raw-first sensor group; a fourth measuring line electrically connected to another first sensor among the plurality of first sensors of the first raw-first sensor group; and an input sensing driver electrically connected to the first signal line, the first measuring line, the second measuring line, the third measuring line, and the fourth measuring line; wherein the input sensing driver is configured to sense a first resistance change value of the first measuring line, the plurality of first sensors of the second raw-first sensor group, and the second measuring line during a first period, wherein the input sensing driver is configured to sense a second resistance change value of the third measuring line, the plurality of first sensors of the first raw-first sensor group, and the fourth measuring line during a first period, wherein the input sensing driver is configured to sense a capacitance value formed by the plurality of first sensors and the plurality of second sensors during a second period, the second period being different from the first period, wherein the input sensing circuit comprises a base film, a plurality of first conductive patterns disposed on the base film, a first insulating layer on the plurality of first conductive patterns, a plurality of second conductive patterns disposed on the first insulating layer, and a second insulating layer on the plurality of second conductive patterns, and wherein each of the first sensors, the second sensors, and the plurality of first connection portions comprises at least of the plurality of first conductive patterns, and the plurality of second connection portions comprises at least of the plurality of second conductive patterns.

The one first sensor among the plurality of first sensors may include: a body portion; a first junction portion protruded from the body portion in a direction substantially parallel to the first direction and connected to the first signal line; and a second junction portion protruded from the body portion in the direction substantially parallel to the first direction and connected to the first measuring line.

A first length of the first junction portion in the first direction may be different from a second length of the second junction portion in the first direction.

The second length may be longer than the first length.

A third length of the first junction portion in the second direction may be equal to or greater than a fourth length of the second junction portion in the second direction and equal to or smaller than four times the fourth length.

The input sensing circuit may further include an insulating layer that covers the plurality of first sensors, the plurality of second sensors, and the first connection portions, at least a portion of each of the second connection portions may be disposed on the insulating layer, and the one first sensor of the plurality of first sensors may include a body portion and a first junction portion protruded from the body portion in the first direction and connected to the first signal line.

The input sensing circuit may further include a second junction portion disposed on the insulating layer, overlapped with the first junction portion, and connected to the one first sensor of the plurality of first sensors and the first measuring line.

A plurality of first contact holes and a second contact hole may be defined through the insulating layer, the second connection portions may be connected to the plurality of second sensors through the first contact holes, and the second junction portion may be connected to the one first sensor of the plurality of first sensors through the second contact hole. /// The input sensing circuit may further include a second signal line electrically connected to one second sensor among the plurality of second sensors.

The input sensing driver may be configured to compare the first resistance change value with the second resistance change value.

The display module may further include an adhesive member disposed between the display panel and the input sensing circuit, the adhesive member having a predetermined elasticity.

The one first sensor among the plurality of first sensors of the second raw-first sensor group may be disposed at one distal end of the first sensor group in the first direction, and the another first sensor among the plurality of first sensors of the second raw-first sensor group may be disposed at an opposing distal end of the first sensor group in the first direction.

The one first sensor among the plurality of first sensors of the first raw-first sensor group may be disposed at one distal end of the first raw-first sensor group in the first direction, and the another first sensor among the plurality of first sensors of the first raw-first sensor group may be disposed at an opposing distal end of the first raw-first sensor group in the first direction.

According to the above, the display device may include the input sensing circuit that may be configured to sense the user's touch and the pressure applied thereto.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
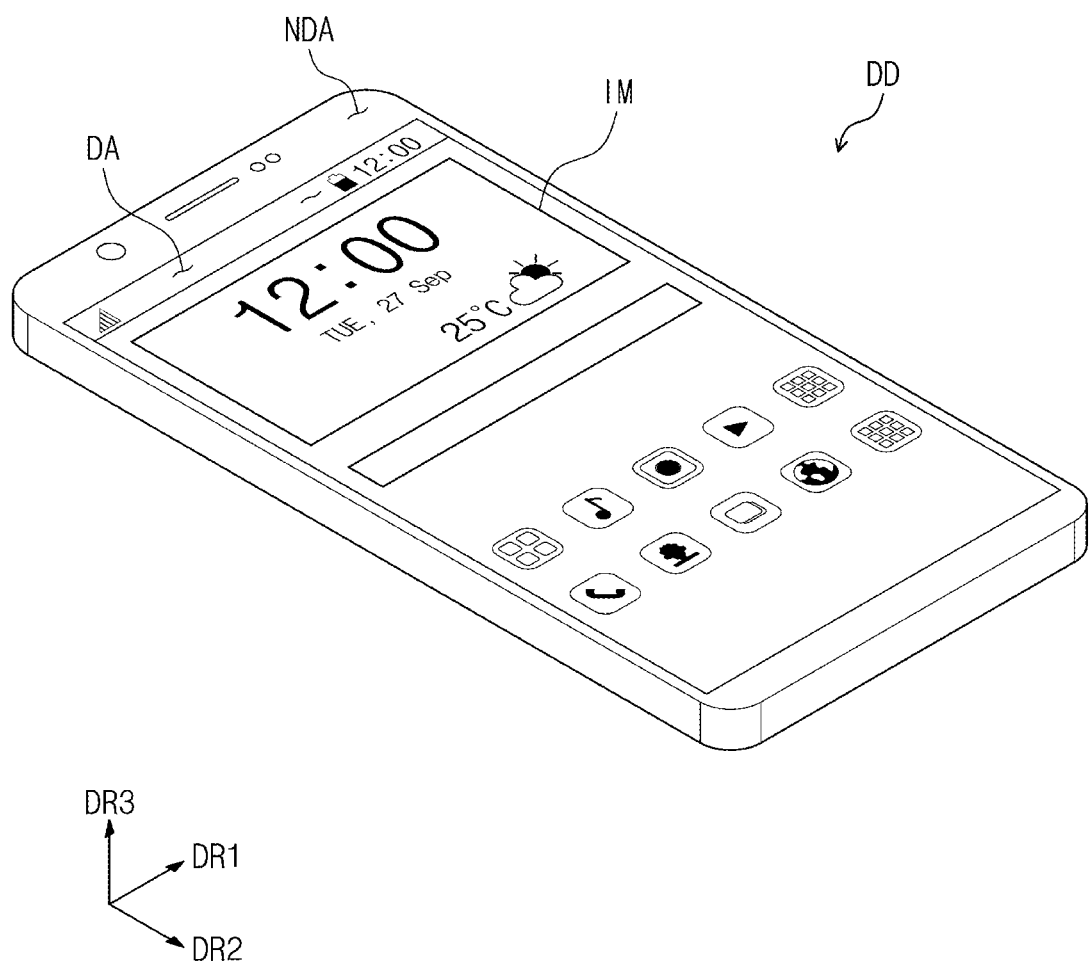
FIG. 1 is a perspective view showing a display device according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the present invention will be explained in detail with reference to the accompanying drawings.

FIG. 1 is a perspective view showing a display device DD according to an embodiment of the present disclosure.

FIG. 1 shows a smartphone as the display device DD, however, the display device DD should not be limited to the smartphone. That is, the display device DD may be a large-sized electronic item, such as a television set or a monitor, or a small and medium-sized electronic item, such as a mobile phone, a tablet computer, a car navigation unit, a game unit, or a smart watch.

The display device DD includes a display area DA and a non-display area NDA, which are defined therein.

The display area DA through which an image IM is displayed may be substantially parallel to a surface defined by a first directional axis DR1 and a second directional axis DR2, however, it should not be limited thereto or thereby. At least a portion of the display area DA may have a dome shape on the surface defined by the first directional axis DR1 and the second directional axis DR2.

A third directional axis DR3 indicates a normal line direction of the display area DA, i.e., a thickness direction of the electronic device DD. Front (or upper) and rear (or lower) surfaces of each member of the display device DD are distinguished from each other by the third directional axis DR3. However, directions indicated by the first, second, and third directional axes DR1, DR2, and DR3 may be relative to each other and may be changed to other directions. Hereinafter, first, second, and third directions respectively correspond to directions indicated by the first, second, and third directional axes DR1, DR2, and DR3 and are assigned with the same reference numerals as the first, second, and third directional axes DR1, DR2, and DR3.

The shape of the display area DA shown in FIG. 1 is merely exemplary, and the shape of the display area DA may be varied without limitation, as needed.

The non-display area NDA is disposed adjacent to the display area DA, and the image IM is not displayed through the non-display area NDA. A bezel area of the display device DD is defined by the non-display area NDA.

The non-display area NDA may surround the display area DA, but it should not be limited thereto or thereby. That is, the display area DA and the non-display area NDA may be designed to have shapes relative to each other.

FIGS. 2A, 2B, 2C, and 2D are cross-sectional views showing the display device DD according to an embodiment of the present disclosure. FIGS. 2A, 2B, 2C, and 2D show a cross-section defined by the second directional axis DR2 and the third directional axis DR3.

FIGS. 2A, 2B, 2C, and 2D simply show the display device DD to explain a stacking relationship of a functional panel and/or functional members of the display device DD.

Figure 2A:
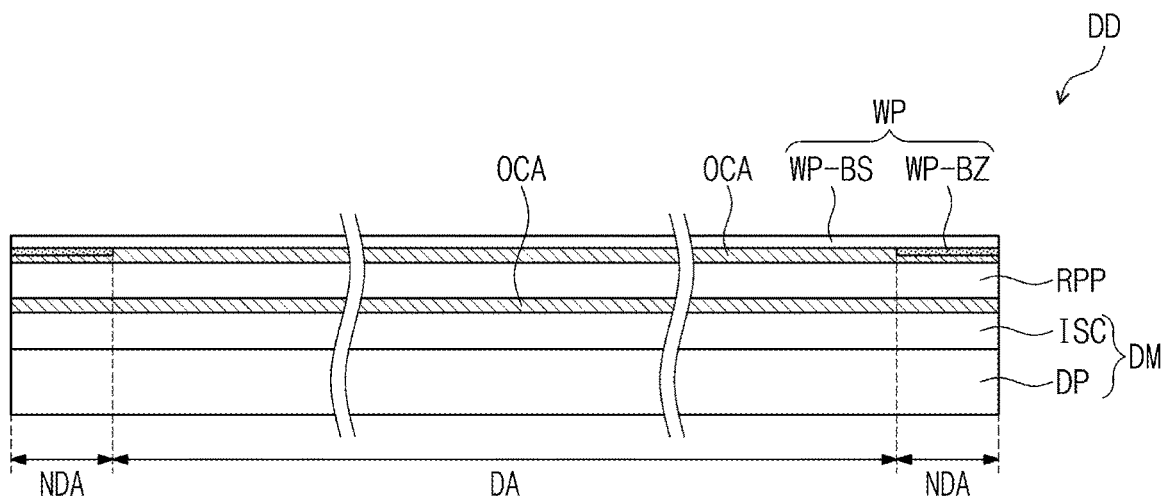
FIGS. 2A, 2B, 2C, and 2D are cross-sectional views showing a display device according to an embodiment of the present disclosure.

Referring to FIG. 2A, the display device DD includes a display panel DP, an input sensing circuit ISC, a reflection preventing member RPP, and a window member WP. The input sensing circuit ISC may be directly disposed on the display panel DP. In the following descriptions, the term "directly disposed" means that a separate adhesive layer/adhesive member is not disposed between two components.

The display panel DP and the input sensing circuit ISC directly disposed on the display panel DP define a display module DM. An optically clear adhesive member (OCA) is disposed between the display module DM and the reflection preventing member RPP and between the reflection preventing member RPP and the window member WP.

Figure 2B:
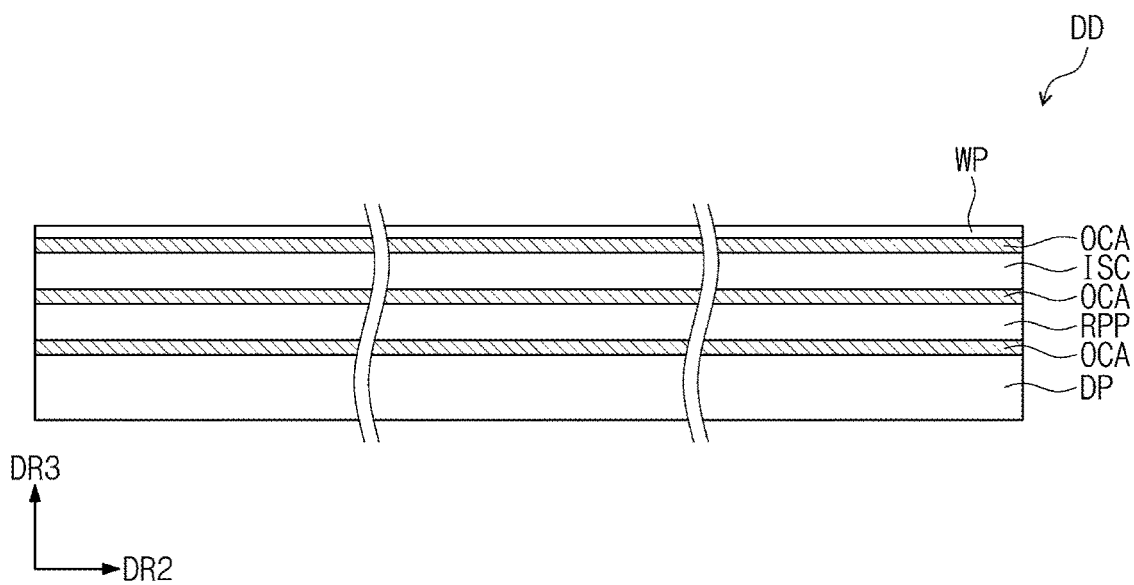
Figure 2C:
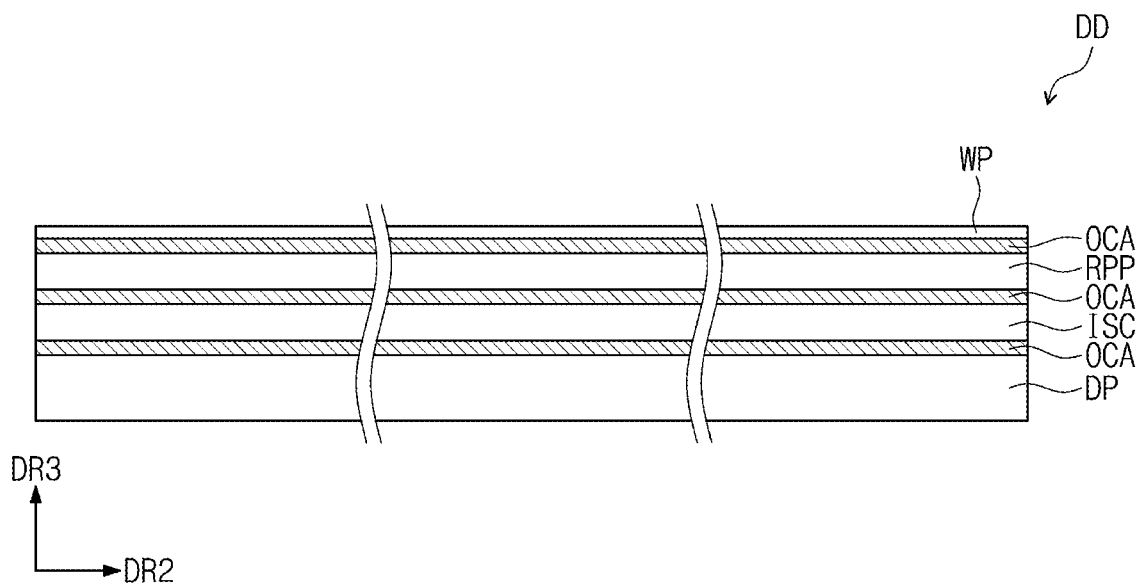
Figure 2D:
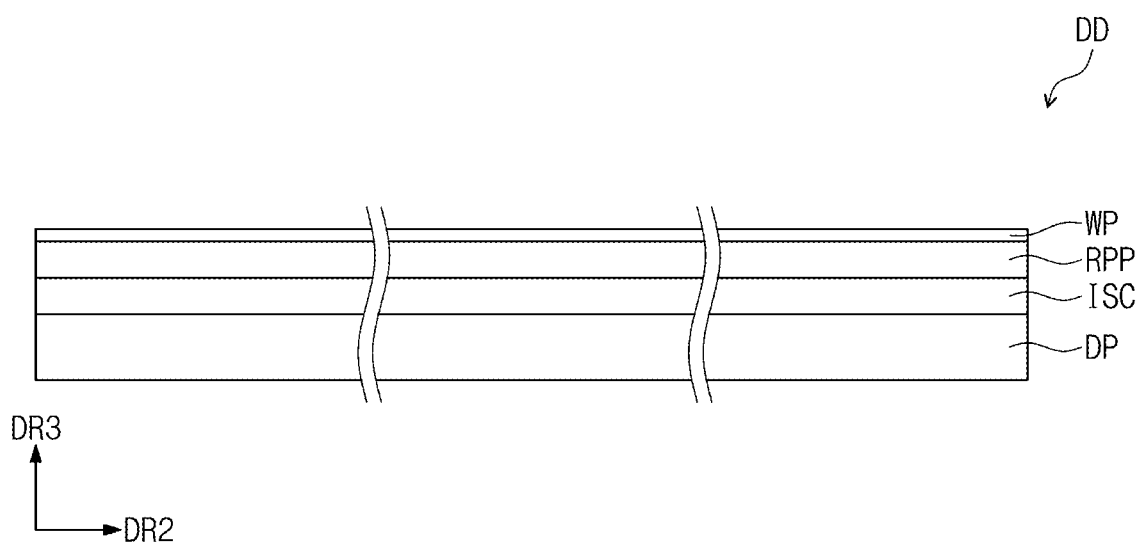

The display panel DP generates an image, and the input sensing circuit ISC acquires coordinate information about an external input, e.g., a touch event or a pressure applied thereto. Although not shown separately, the display module DM according to an embodiment of the present disclosure may further include a protective member disposed on a lower surface of the display panel DP. The protective member and the display panel DP are coupled to each other by an adhesive member. Display devices DD, which are shown in FIGS. 2B, 2C, and 2D and described later, may also further include the protective member.

The display panel DP according to an embodiment of the present disclosure may be a light emitting type display panel. For instance, the display panel DP may be an organic light emitting display panel, a quantum dot light emitting display panel, or a micro LED display panel. A light emitting layer of the organic light emitting display panel may include an organic light emitting material. A light emitting layer of the quantum dot light emitting display panel may include a quantum dot and a quantum rod. Hereinafter, the organic light emitting display panel will be described as the display panel DP.

The reflection preventing member RPP reduces a reflectance of an external light incident from above the window member WP. The reflection preventing member RPP according to an embodiment of the present disclosure may include a retarder and a polarizer.

The reflection preventing member RPP according to an embodiment of the present disclosure may include color filters.

The window member WP according to an embodiment of the present disclosure includes a base film WP-BS and a light blocking pattern WP-BZ. The base film WP-BS may include a glass and/or a synthetic resin. The base film WP-BS should not be limited to a single-layer structure. The base film WP-BS may include two or more films coupled to each other by an adhesive member.

The light blocking pattern WP-BZ partially overlaps with the base film WP-BS. The light blocking pattern WP-BZ is disposed on a rear surface of the base film WP-BS to define a bezel area of the display device DD, i.e., the non-display area NDA.

Hereinafter, the light blocking pattern WP-BZ and the base film WP-BS are not shown in FIGS. 2B, 2C, and 2D.

Referring to FIG. 2B, the display device DD includes a display panel DP, a reflection preventing member RPP, an input sensing circuit ISC, and a window member WP.

The display panel DP and the reflection preventing member RPP may be coupled to each other by an optically clear adhesive member OCA. The reflection preventing member RPP and the input sensing circuit ISC may be coupled to each other by the optically clear adhesive member OCA. The input sensing circuit ISC and the window member WP may be coupled to each other by the optically clear adhesive member OCA.

Referring to FIG. 2C, different from the stacking structure shown in FIG. 2B, a position of a reflection preventing member RPP and a position of an input sensing circuit ISC are changed to each other.

The optically clear adhesive member OCA may have a predetermined elasticity. When the pressure is applied from the outside, the input sensing circuit ISC may be deformed in the third direction DR3 due to the elasticity of the optically clear adhesive member OCA.

As shown in FIG. 2D, adhesive members may be omitted from the display device DD, and a display panel DP, an input sensing circuit ISC, a reflection preventing member RPP, and a window member WP may be formed through a consecutive process. According to another embodiment of the present disclosure, a stacking order of the input sensing circuit ISC and the reflection preventing member RPP may be changed to each other.

The input sensing circuit ISC may be a circuit that senses the user's touch or the pressure applied thereto from the outside.

Figure 3:
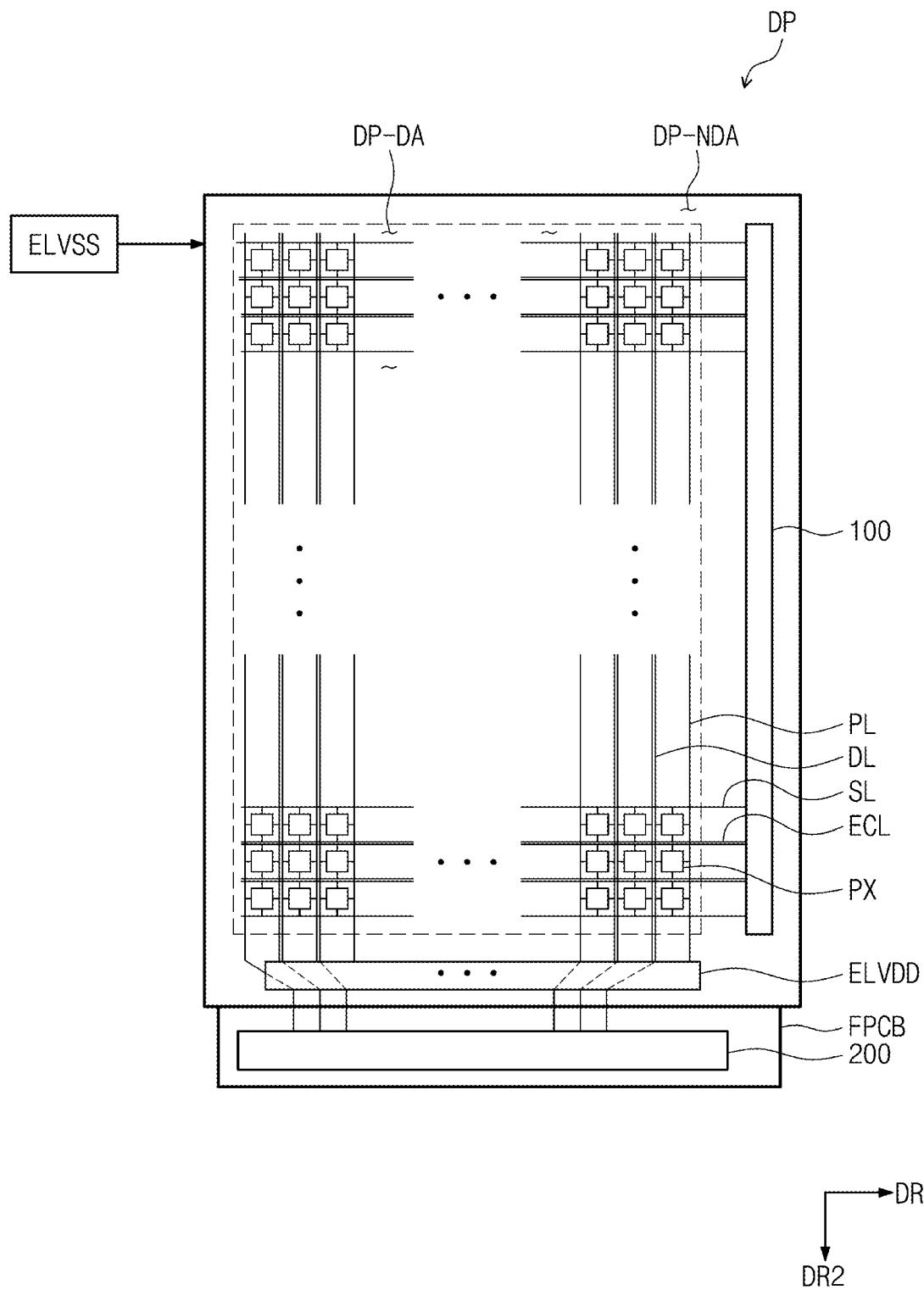
FIG. 3 is a plan view showing a display panel according to an embodiment of the present disclosure.

FIG. 3 is a plan view showing the display panel DP according to an embodiment of the present disclosure.

Referring to FIG. 3, the display panel DP includes a display area DP-DA and a non-display area DP-NDA when viewed in a plan view. In the present embodiment, the non-display area DP-NDA may be defined along an edge of the display area DP-DA. The display area DP-DA and the non-display area DP-NDA of the display panel DP may respectively correspond to the display area DA and the non-display area NDA of the display device DD.

The display panel DP includes a scan driver 100, a data driver 200, a plurality of scan lines SL, a plurality of light emitting control lines ECL, a plurality of data lines DL, a plurality of power lines PL, and a plurality of pixels PX. The pixels PX are arranged in the display area DP-DA. Each of the pixels PX includes an organic light emitting diode OLED (refer to FIG. 4) and a pixel circuit CC (refer to FIG. 4) connected to the organic light emitting diode OLED.

The scan driver 100 includes a scan driving unit and a light emitting control driving unit.

The scan driving unit generates scan signals and sequentially applies the generated scan signals to the scan lines SL. The light emitting control driving unit generates light emitting control signals and outputs the generated light emitting control signals to the light emitting control lines ECL.

According to another embodiment of the present disclosure, the scan driving unit and the light emitting control driving unit may be provided in one circuit in the scan driver 100 without being distinguished from each other.

The scan driver 100 may include a plurality of thin film transistors formed through the same process, e.g., a low temperature polycrystalline silicon (LTPS) process or a low temperature polycrystalline oxide (LTPO) process, as a driving circuit of the pixels PX.

The data driver 200 applies data signals to the data lines DL. The data signals are analog voltages corresponding to grayscale values of image data.

In an embodiment of the present disclosure, the data driver 200 is mounted on a printed circuit board FPCB, and the printed circuit board FPCB is connected to pads disposed at one ends of the data lines DL. However, according to another embodiment, the data driver 200 may be directly mounted on the display panel DP.

The scan lines SL extend in the first direction DR1 and are arranged in the second direction DR2.

The light emitting control lines ECL extend in the first direction DR1 and are arranged in the second direction DR2. That is, each of the light emitting control lines ECL is arranged substantially parallel to a corresponding scan line among the scan lines SL.

The data lines DL extend in the second direction DR2 and are arranged in the first direction DR1. The data lines DL apply the data signals to corresponding pixels PX.

The power lines PL extend in the second direction DR2 and are arranged in the first direction DR1. The power lines PL apply a first power voltage ELVDD to corresponding pixels PX.

Each of the pixels PX is connected to a corresponding scan line among the scan lines SL, a corresponding light emitting control line among the light emitting control lines ECL, a corresponding data line among the data lines DL, and a corresponding power line among the power lines PL.

Figure 4:
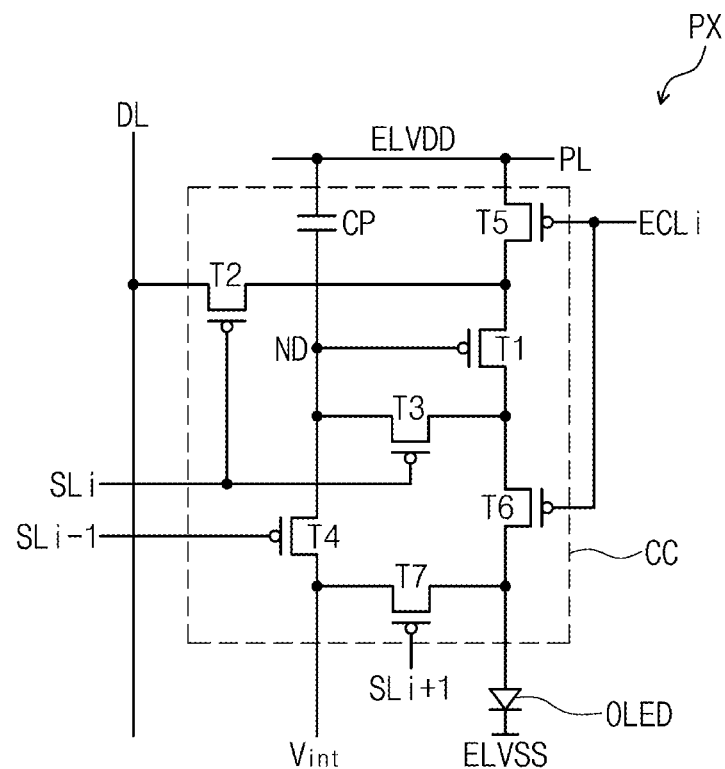
FIG. 4 is an equivalent circuit diagram showing a pixel according to an embodiment of the present disclosure.
Figure 5:
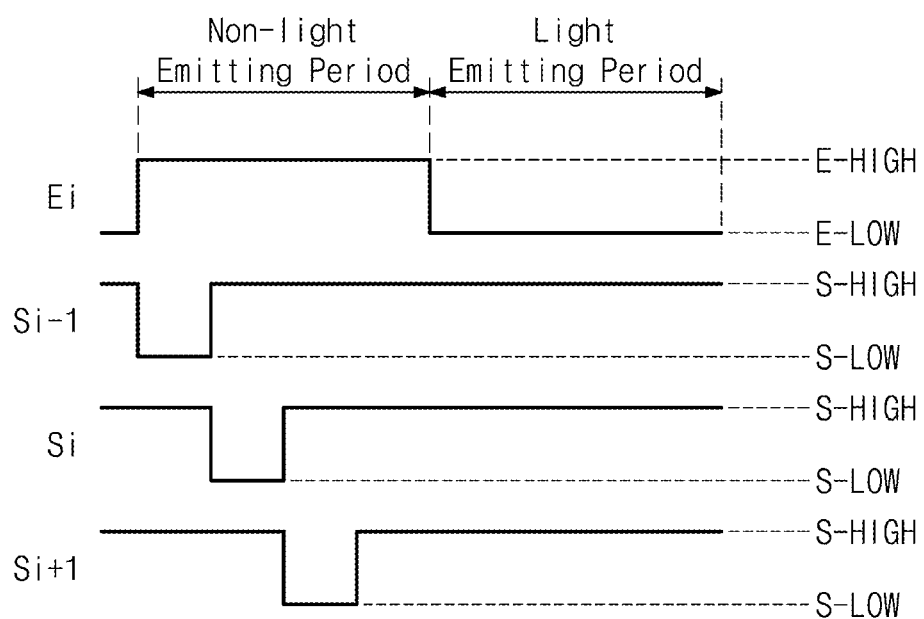
FIG. 5 is a waveform diagram showing signals applied to the pixel of FIG. 4.

FIG. 4 is an equivalent circuit diagram showing the pixel PX according to an embodiment of the present disclosure. FIG. 5 is a waveform diagram showing the light emitting control signal Ei and the scan signals Si−1, Si, and Si+1, which are applied to the pixel PX of FIG. 4. FIG. 4 shows the pixel PX connected to an i-th scan line SLi and an i-th light emitting control line ECLi. Here, the number i is a natural number.

Referring to FIG. 4, the pixel PX includes the organic light emitting diode OLED and the pixel circuit CC. The pixel circuit CC includes a plurality of transistors T1 to T7 and a capacitor CP. The pixel circuit CC controls an amount of current flowing through the organic light emitting diode OLED in response to the data signal.

The organic light emitting diode OLED emits a light at a predetermined brightness in response to the current provided from the pixel circuit CC. To this end, a level of the first power voltage ELVDD is set higher than a level of a second power voltage ELVSS.

Each of the transistors T1 to T7 includes an input electrode (or a source electrode), an output electrode (or a drain electrode), and a control electrode (or a gate electrode). For the convenience of explanation, one electrode of the input electrode and the output electrode is referred to as "first electrode", and the other electrode of the input electrode and the output electrode is referred to as "second electrode".

The first electrode of the first transistor T1 is connected to the first power voltage ELVDD via the fifth transistor T5, and the second electrode of the first transistor T1 is connected to an anode electrode of the organic light emitting diode OLED via the sixth transistor T6. The first transistor T1 may be referred to as "driving transistor" in the following descriptions.

The first transistor T1 controls the amount of the current flowing through the organic light emitting diode OLED in response to a voltage applied to the control electrode.

The second transistor T2 is connected between the data line DL and the first electrode of the first transistor T1. The control electrode of the second transistor T2 is connected to the i-th scan line SLi. The second transistor T2 is turned on when an i-th scan signal Si is applied to the i-th scan line SLi to electrically connect the data line DL to the first electrode of the first transistor T1.

The third transistor T3 is connected between the second electrode and the control electrode of the first transistor T1. The control electrode of the third transistor T3 is connected to the i-th scan line SLi. The third transistor T3 is turned on when the i-th scan signal Si is applied to the i-th scan line SLi to electrically connect the second electrode and the control electrode of the first transistor T1. Accordingly, when the third transistor T3 is turned on, the first transistor T1 is connected in a diode configuration.

The fourth transistor T4 is connected between a node ND and an initialization voltage generator. The control electrode of the fourth transistor T4 is connected to an (i−1)th scan line SLi−1. The fourth transistor T4 is turned on when an (i−1)th scan signal Si−1 is applied to the (i−1)th scan line SLi−1 to apply an initialization voltage Vint to the node ND.

The fifth transistor T5 is connected between the power line PL and the first electrode of the first transistor T1. The control electrode of the fifth transistor T5 is connected to the i-th light emitting control line ECLi.

The sixth transistor T6 is connected between the second electrode of the first transistor T1 and the anode electrode of the organic light emitting diode OLED. The control electrode of the sixth transistor T6 is connected to the i-th light emitting control line ECLi.

The seventh transistor T7 is connected between the initialization voltage generator and the anode electrode of the organic light emitting diode OLED. The control electrode of the seventh transistor T7 is connected to an (i+1)th scan line SLi+1. The seventh transistor T7 is turned on when an (i+1)th scan signal Si+1 is applied to the (i+1)th scan line SLi+1 to apply the initialization voltage Vint to the anode electrode of the organic light emitting diode OLED.

The seventh transistor T7 improves a black display performance of the pixel PX. In detail, when the seventh transistor T7 is turned on, a parasitic capacitor of the organic light emitting diode OLED is discharged. Accordingly, when a black brightness is realized, the organic light emitting diode OLED does not emit the light even though a leakage current from the first transistor T1 occurs, and thus the black display performance of the pixel PX is improved.

In FIG. 4, the control electrode of the seventh transistor T7 is connected to the (i+1)th scan line SLi+1, but it should be clear that the present disclosure is not limited to such embodiments. According to another embodiment of the present disclosure, the control electrode of the seventh transistor T7 may be connected to the i-th scan line SLi or the (i−1)th scan line SLi−1.

In FIG. 4, the first to seventh transistors T1 to T7 of the pixel PX have been described based on a PMOS, but they should not be limited thereto or thereby. According to another embodiment of the present disclosure, the first to seventh transistors T1 to T7 of the pixel PX may be implemented by an NMOS. According to another embodiment of the present disclosure, the first to seventh transistors T1 to T7 of the pixel PX may be implemented by a combination of the PMOS and the NMOS.

The capacitor CP is disposed between the power line PL and the node ND. The capacitor CP is charged with a voltage corresponding to the data signal. When the fifth and sixth transistors T5 and T6 are turned on, the amount of current flowing through the first transistor T1 is determined depending on the voltage charged in the capacitor CP.

In the present disclosure, the configuration of the pixel PX should not be limited to the configuration shown in FIG. 4. According to another embodiment of the present disclosure, the pixel PX may be implemented in various ways to allow the organic light emitting diode OLED to emit the light.

Referring to FIG. 5, the light emitting control signal Ei has a high level E-HIGH or a low level E-LOW. Each of the scan signals SLi−1, SLi, and SLi+1 has a high level S-HIGH or a low level S-LOW.

When the light emitting control signal Ei has the high level E-HIGH, the fifth and sixth transistors T5 and T6 are turned off. When the fifth transistor T5 is turned off, the power line PL and the first electrode of the first transistor T1 are electrically blocked from each other. When the sixth transistor T6 is turned off, the second electrode of the first transistor T1 and the anode electrode of the organic light emitting diode OLED are electrically blocked from each other. Accordingly, the organic light emitting diode OLED does not emit the light during a period in which the light emitting control signal Ei having the high level E-HIGH is applied to the i-th light emitting control line ECLi.

Then, when the (i−1)th scan signal Si−1 applied to the (i−1)th scan line SLi−1 has the low level S-LOW, the fourth transistor T4 is turned on. When the fourth transistor T4 is turned on, the initialization voltage Vint is applied to the node ND.

When the i-th scan signal Si applied to the i-th scan line SLi has the low level S-LOW, the second and third transistors T2 and T3 are turned on.

When the second transistor T2 is turned on, the data signal is applied to the first electrode of the first transistor T1. In this case, since the node ND is initialized to have the initialization voltage Vint, the first transistor T1 is turned on. When the first transistor T1 is turned on, the voltage corresponding to the data signal is applied to the node ND. In this case, the capacitor CP is charged with the voltage corresponding to the data signal.

When the (i+1)th scan signal Si+1 applied to the (i+1)th scan line SLi+1 has the low level S-LOW, the seventh transistor T7 is turned on.

When the seventh transistor T7 is turned on, the initialization voltage Vint is applied to the anode electrode of the organic light emitting diode OLED, and thus the parasitic capacitor of the organic light emitting diode OLED is discharged.

When the light emitting control signal Ei applied to the light emitting control line ECLi has the low level E-LOW, the fifth and sixth transistors T5 and T6 are turned on. When the fifth transistor T5 is turned on, the first power voltage ELVDD is applied to the first electrode of the first transistor T1. When the sixth transistor T6 is turned on, the second electrode of the first transistor T1 and the anode electrode of the organic light emitting diode OLED are electrically connected to each other. Accordingly, the organic light emitting diode OLED generates the light with the predetermined brightness in response to the amount of the current applied thereto.

Figure 6:
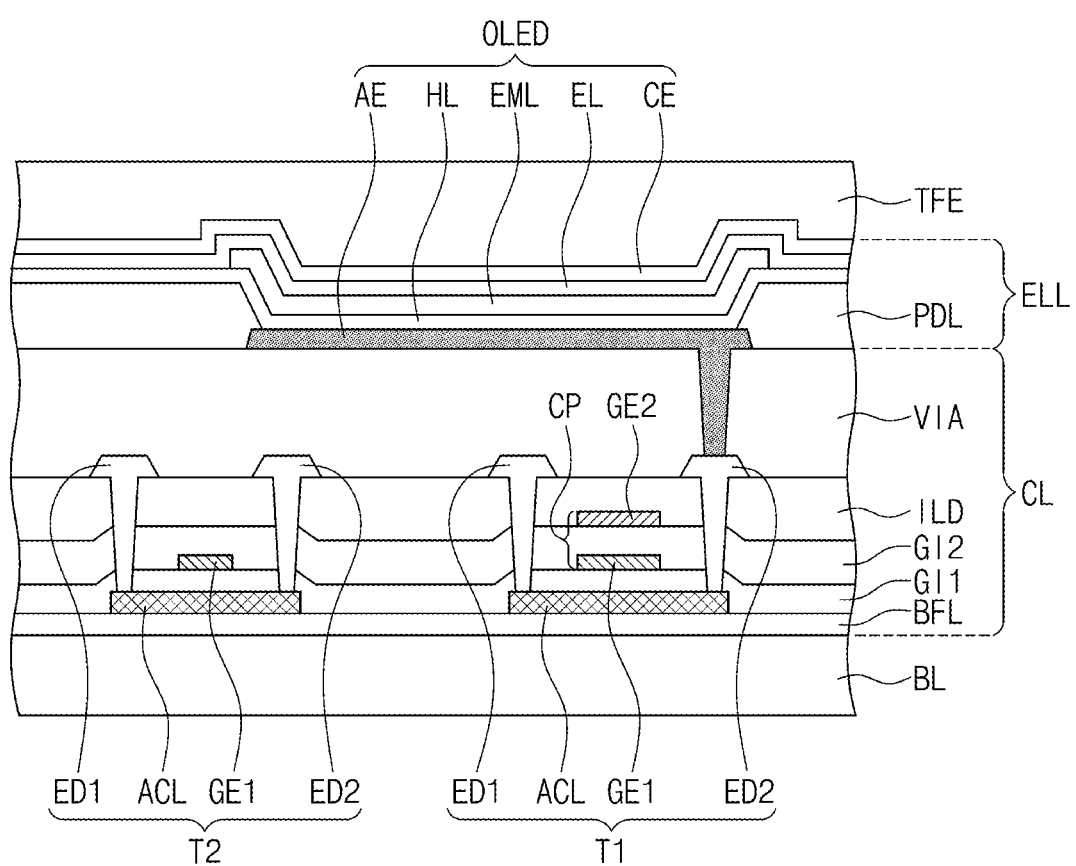
FIG. 6 is a cross-sectional view showing a portion of a pixel according to an embodiment of the present disclosure.

FIG. 6 is a cross-sectional view showing a portion of the pixel PX (refer to FIG. 4) according to an embodiment of the present disclosure. FIG. 6 shows the first and second transistors T1 and T2 as a representative example, but the structure of the first and second transistors T1 and T2 should not be limited thereto or thereby. In FIG. 6, it seems that the second electrode ED2 of the first transistor T1 directly makes contact with the anode electrode AE of the pixel PX, but this is because FIG. 6 shows a cross-sectional shape. In the present embodiment, as shown in FIG. 4, the first transistor T1 is connected to the anode electrode AE of the pixel PX via the sixth transistor T6, but it should not be limited thereto or thereby. That is, according to another embodiment of the present disclosure, the second electrode ED2 of the first transistor T1 may directly make contact with the anode electrode AE of the pixel PX.

The display panel DP (refer to FIG. 3) includes a base layer BL, a circuit layer CL, a light emitting device layer ELL, and an encapsulation layer TFE.

The circuit layer CL includes a buffer layer BFL, gate insulating layers GI1 and GI2, an interlayer insulating layer ILD, a circuit insulating layer VIA, and the transistors T1 and T2.

The light emitting device layer ELL may include the organic light emitting diode OLED and a pixel definition layer PDL.

The encapsulation layer TFE encapsulates the light emitting device layer ELL to protect the light emitting device layer ELL from external oxygen or moisture.

The buffer layer BFL is disposed on one surface of the base layer BL.

The buffer layer BFL prevents or suppresses foreign substances in the base layer BL from entering the pixel PX during a manufacturing process. In particular, the buffer layer BFL prevents or suppresses the foreign substances from entering active portions ACL of the transistors T1 and T2 of the pixel PX.

The foreign substances may inflow from the outside or may be generated when the base layer BL is pyrolyzed. The foreign substances may be gas or sodium discharged from the base layer BL. In addition, the buffer layer BFL blocks moisture from entering the pixel PX from the outside.

The active portions ACL of the transistors T1 and T2 are disposed on the buffer layer BFL. Each of the active portions ACL includes polysilicon or amorphous silicon. As another way, the active portions ACL may include a metal oxide semiconductor.

The active portions ACL include a channel area that serves as a passage through which electrons or holes move, a first ion doping area, and a second ion doping area disposed such that the channel area is disposed between the first ion doping area and the second ion doping area.

A first gate insulating layer GI1 is disposed above the buffer layer BFL to cover the active portions ACL. The first gate insulating layer GI1 includes an organic layer and/or an inorganic layer. The first gate insulating layer GI1 includes a plurality of inorganic thin film layers. The inorganic thin film layers include a silicon nitride layer and a silicon oxide layer.

The control electrodes GE1 of the transistors T1 and T2 are disposed on the first gate insulating layer GI1. The control electrode GE1 of the first transistor T1 may be one of two electrodes forming the capacitor CP. At least some of the scan lines SL (refer to FIG. 3) and the light emitting control lines ECL (refer to FIG. 3) are disposed on the first gate insulating layer GI1.

A second gate insulating layer GI2 is disposed on the first gate insulating layer GI1 to cover the control electrodes GE1. The second gate insulating layer GI2 includes an organic layer and/or an inorganic layer. The second gate insulating layer GI2 includes a plurality of inorganic thin film layers. The inorganic thin film layers include a silicon nitride layer and a silicon oxide layer.

The other electrode GE2 of the two electrodes forming the capacitor CP (refer to FIG. 4) is disposed on the second gate insulating layer GI2. That is, the control electrode GE1 disposed on the first gate insulating layer GI1 overlaps with the electrode GE2 disposed on the second gate insulating layer GI2 to form the capacitor CP shown in FIG. 4. However, positions of the electrodes forming the capacitor CP should not be limited thereto or thereby.

The interlayer insulating layer ILD is disposed on the second gate insulating layer GI2 to cover the electrode GE2. The interlayer insulating layer ILD includes an organic layer and/or an inorganic layer. The interlayer insulating layer ILD includes a plurality of inorganic thin film layers. The inorganic thin film layers include a silicon nitride layer and a silicon oxide layer.

At least some portions of the data line DL (refer to FIG. 3) and the power line PL (refer to FIG. 3) are disposed on the interlayer insulating layer ILD. The first electrodes ED1 and the second electrodes ED2 of the transistors T1 and T2 are disposed on the interlayer insulating layer ILD.

The first electrodes ED1 and the second electrodes ED2 are connected to corresponding active portions ACL through thru-holes defined through the gate insulating layers GI1 and GI2 and the interlayer insulating layer ILD.

The circuit insulating layer VIA is disposed on the interlayer insulating layer ILD to cover the first electrodes ED1 and the second electrodes ED2. The circuit insulating layer VIA includes an organic layer and/or an inorganic layer. The circuit insulating layer VIA provides a flat surface.

The pixel definition layer PDL and the organic light emitting diode OLED are disposed on the circuit insulating layer VIA.

The organic light emitting diode OLED may include an anode electrode AE, a hole control layer HL, a light emitting layer EML, an electron control layer EL, and a cathode electrode CE.

Figure 7A:
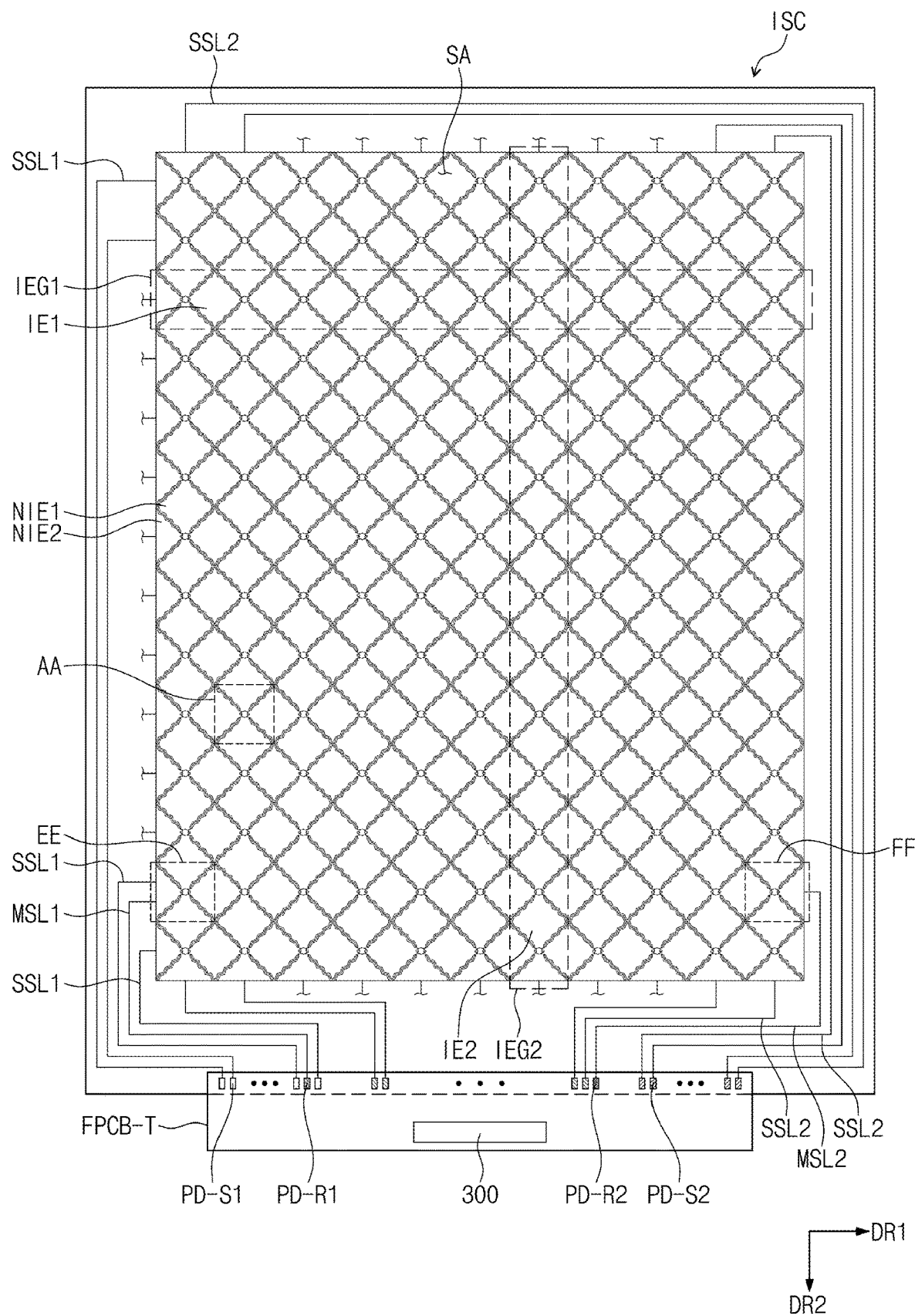
FIG. 7A is a plan view showing an input sensing circuit according to an embodiment of the present disclosure.
Figure 7B:
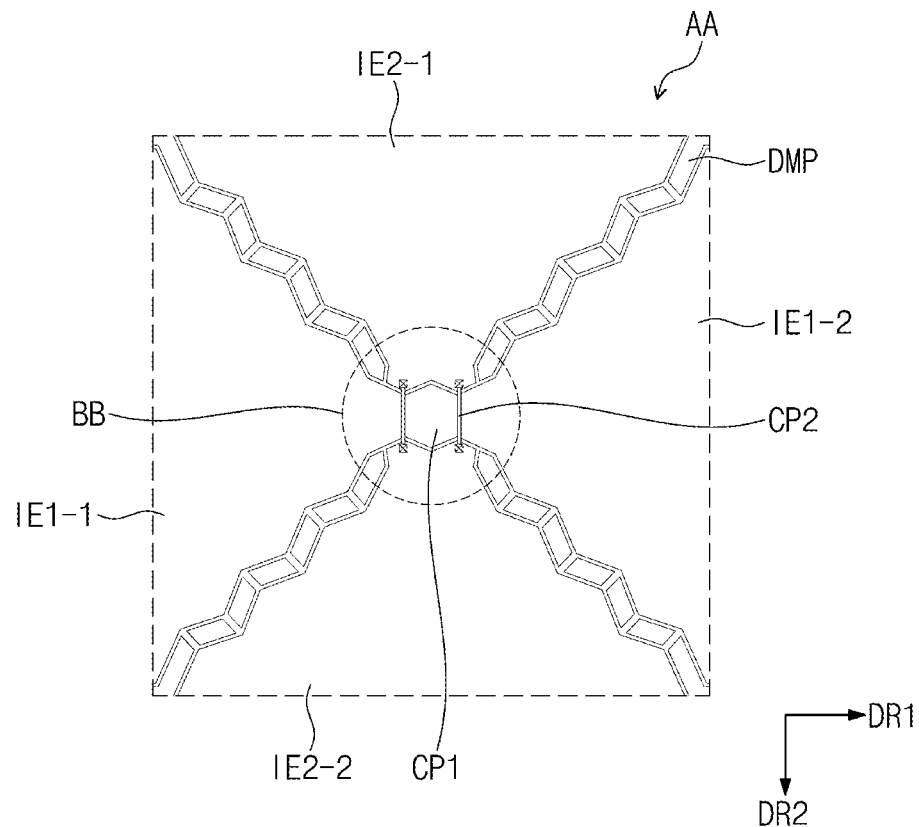
FIG. 7B is an enlarged plan view showing a portion AA of FIG. 7A.
Figure 7C:
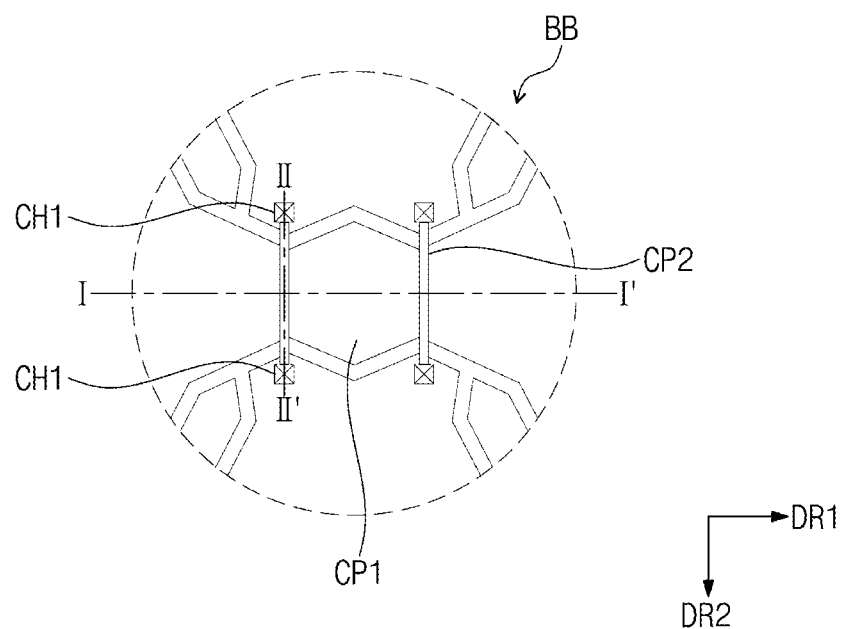
FIG. 7C is an enlarged plan view showing a portion BB of FIG. 7A.
Figure 8A:
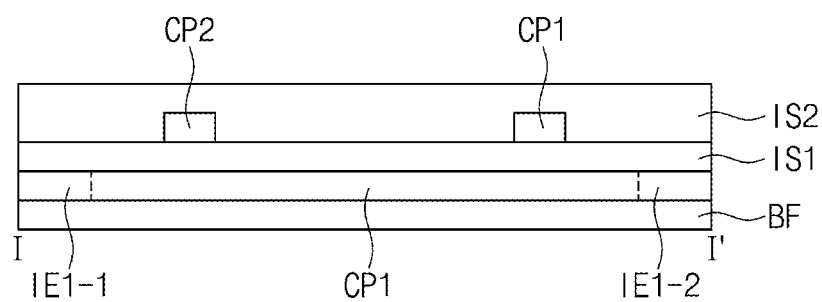
FIG. 8A is a cross-sectional view taken along a sectional line I-I' of FIG. 7C.
Figure 8B:
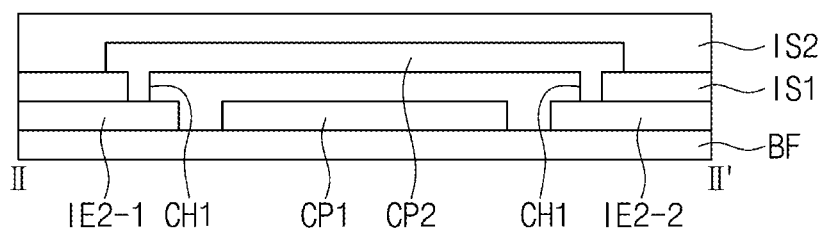
FIG. 8B is a cross-sectional view taken along a sectional line II-II' of FIG. 7C.

FIG. 7A is a plan view showing the input sensing circuit ISC according to an embodiment of the present disclosure. FIG. 7B is an enlarged plan view showing a portion AA of FIG. 7A. FIG. 7C is an enlarged plan view showing a portion BB of FIG. 7A. FIG. 8A is a cross-sectional view taken along a sectional line I-I' of FIG. 7C. FIG. 8B is a cross-sectional view taken along a sectional line II-II' of FIG. 7C.

The input sensing circuit ISC may include an input sensing area SA defined therein to sense the external input.

The input sensing circuit ISC may include first sensor groups IEG1, second sensor groups IEG2, first connection portions CP1, second connection portions CP2, first signal lines SSL1, second signal lines SSL2, a first measuring line MSL1, a second measuring line MSL2, signal pads PD-S1 and PD-S2, sensing pads PD-R1 and PD-R2, a printed circuit board FPCB-T, and an input sensing driver 300. In an embodiment of the present disclosure, the input sensing circuit ISC may further include a base film BF, a first insulating layer IS1, or a second insulating layer IS2.

Each of the first sensor groups IEG1 may extend in the first direction DR1, and the first sensor groups IEG1 may be arranged in the second direction DR2. Each of the first sensor groups IEG1 may include a plurality of first sensors IE1. The first sensors IE1 may be arranged in the first direction DR1. As an example, the first sensor IE1 may be an Rx sensor.

Each of the second sensor groups IEG2 may extend in the second direction DR2, and the second sensor groups IEG2 may be arranged in the first direction DR1. Each of the second sensor groups IEG2 may include a plurality of second sensors IE2. The second sensors IE2 may be arranged in the second direction DR2. As an example, the second sensor IE2 may be a Tx sensor.

A length of the first sensor group IEG1 in the first direction DR1 may be shorter than a length of the second sensor group IEG2 in the second direction DR2.

In an embodiment of the present disclosure, the first sensors IE1 and the second sensors IE2 may include indium tin oxide (ITO) or indium zinc oxide (IZO), however, they should not be limited thereto or thereby. That is, the first sensors IE1 and the second sensors IE2 may include molybdenum (Mo).

In an embodiment of the present disclosure, each of the first sensors IE1 may be capacitively coupled to the second sensors IE2 adjacent thereto among the second sensors IE2 to form a capacitance. The input sensing circuit ISC may sense a variation in capacitance formed between the first sensors IE1 and the second sensors IE2 to determine whether the external input is applied thereto.

Dummy patterns DMP may be disposed between the first sensors IE1 and the second sensors IE2. The dummy patterns DMP may be disposed spaced apart from the first sensors IE1 and the second sensors IE2. The dummy patterns DMP may be insulated from the first sensors IE1 and the second sensors IE2. When the dummy patterns DMP are disposed, a boundary area between the first sensors IE1 and the second sensors IE2 may be invisible to the user.

In an embodiment of the present disclosure, the dummy patterns DMP may include indium tin oxide or indium zinc oxide.

In an embodiment of the present disclosure, each of the first sensors IE1 and the second sensors IE2 may be defined as one of a first normal sensor NIE1 and a second normal sensor NIE2 depending on their area.

Among the first sensors IE1 and the second sensors IE2, sensors having a lozenge shape and a first area may be defined as the first normal sensor NIE1.

Among the first sensors IE1 and the second sensors IE2, sensors having an isosceles triangular shape and a second area corresponding to a half of the first area may be defined as the second normal sensor NIE2.

The first signal lines SSL1 may be electrically connected to the first sensor groups IEG1, respectively. In an embodiment of the present disclosure, the first signal lines SSL1 may be connected to the first sensor groups IEG1 in a single routing structure.

The second signal lines SSL2 may be electrically connected to the second sensor groups IEG2, respectively. In an embodiment of the present disclosure, the second signal lines SSL2 may be connected to the second sensor groups IEG2 in a double routing structure.

The first measuring line MSL1 and the second measuring line MSL2 may be connected to at least one of the first sensor groups IEG1. The first measuring line MSL1 and the second measuring line MSL2 may be connected to the input sensing driver 300.

The input sensing driver 300 may sense a change in a resistance value of the first measuring line MSL1, the second measuring line MSL2, the first sensors IE1 of the first sensor group IEG1 connected to the first and second measuring lines MSL1 and MSL2, and the first connection portions CP1.

When the pressure is applied from the outside, the resistance value of the first sensors IE1 is changed due to the pressure applied to the first sensors IE1, and it is possible to sense whether the pressure is externally applied by measuring the change in the resistance value.

The first signal pads PD-S1 may be connected to the first signal lines SSL1. The second signal pads PD-S2 may be connected to the second signal lines SSL2.

The first sensing pads PD-S1 may be connected to the first measuring line MSL1, and the second sensing pads PD-S2 may be connected to the second measuring line MSL2.

The printed circuit board FPCB-T may be electrically connected to the signal pads PD-S1 and PD-S2 and the sensing pads PD-R1 and PD-R2.

The input sensing driver 300 may be mounted on the printed circuit board FPCB-T. The input sensing driver 300 may transmit, receive, or calculate electrical signals used to determine whether the user's touch occurs in the input sensing area SA and whether the pressure is applied to the input sensing area SA.

A time period in which the input sensing driver 300 determines whether the user's touch occurs may be different from a time period in which the input sensing driver 300 determines whether the pressure is applied. For example, the input sensing driver 300 determines whether the pressure is applied during a first period and the input sensing driver 300 determines whether the user's touch occurs during a second period, wherein the first period and the second period are different from each other. This is because when the signal used to determine whether the user's touch occurs and the signal used to determine whether the pressure is applied are substantially simultaneously applied, one signal of the signals exerts influence on the other signal, and the input sensing driver 300 may not make an accurate determination.

The portion AA of FIG. 7A, which is shown in FIG. 7B, is defined as a unit area AA required to sense the external input by the input sensing circuit ISC. A left first sensor IE1-1, a right first sensor IE1-2, an upper second sensor IE2-1, and a lower second sensor IE2-2 are arranged in the unit area AA.

The first sensors IE1-1 and IE1-2 and the second sensor IE2-1 and IE2-2 form the capacitance in the unit area AA.

The left first sensor IE1-1 and the right first sensor IE1-2 are electrically connected to each other by the first connection portion CP1. The left first sensor IE1-1, the right first sensor IE1-2, and the first connection portion CP1 may be disposed on the same layer.

The upper second sensor IE2-1 and the lower second sensor IE2-2 are electrically connected to each other by the second connection portion CP2. At least a portion of the second connection portion CP2 may be disposed on a layer different from the upper second sensor IE2-1 and the lower second sensor IE2-2.

Although not shown separately, an antistatic pattern may be connected to each of the upper second sensor E2-1 and the lower second sensor IE2-2. The antistatic pattern may induce static electricity to its vertex to prevent or protect the second connection portion CP2 from being disconnected.

Referring to FIGS. 8A and 8B, the first sensors IE1-1 and IE1-2, the second sensors IE2-1 and IE2-2, and the first connection portions CP1 may be disposed on the base film BF.

The first insulating layer IS1 may be disposed on the base film BF and may cover the first sensors IE1-1 and IE1-2, the second sensors IE2-1 and IE2-2, and the first connection portions CP1. The first insulating layer IS1 may be provided with first contact holes CH1 defined therethrough.

At least a portion of each of the second connection portions CP2 may be disposed on the first insulating layer IS1. The second connection portions CP2 may be connected to the second sensors IE2-1 and IE2-2 through the first contact holes CH1.

The second insulating layer IS2 may be disposed on the first insulating layer IS1 to cover the second connection portions CP2.

Each of the first insulating layer IS1 and the second insulating layer IS2 may include an organic material or an inorganic material.

According to another embodiment of the present disclosure, the base film BF shown in FIGS. 8A and 8B may be replaced with the encapsulation layer TFE (refer to FIG. 6) of the display panel DP.

Figure 9:
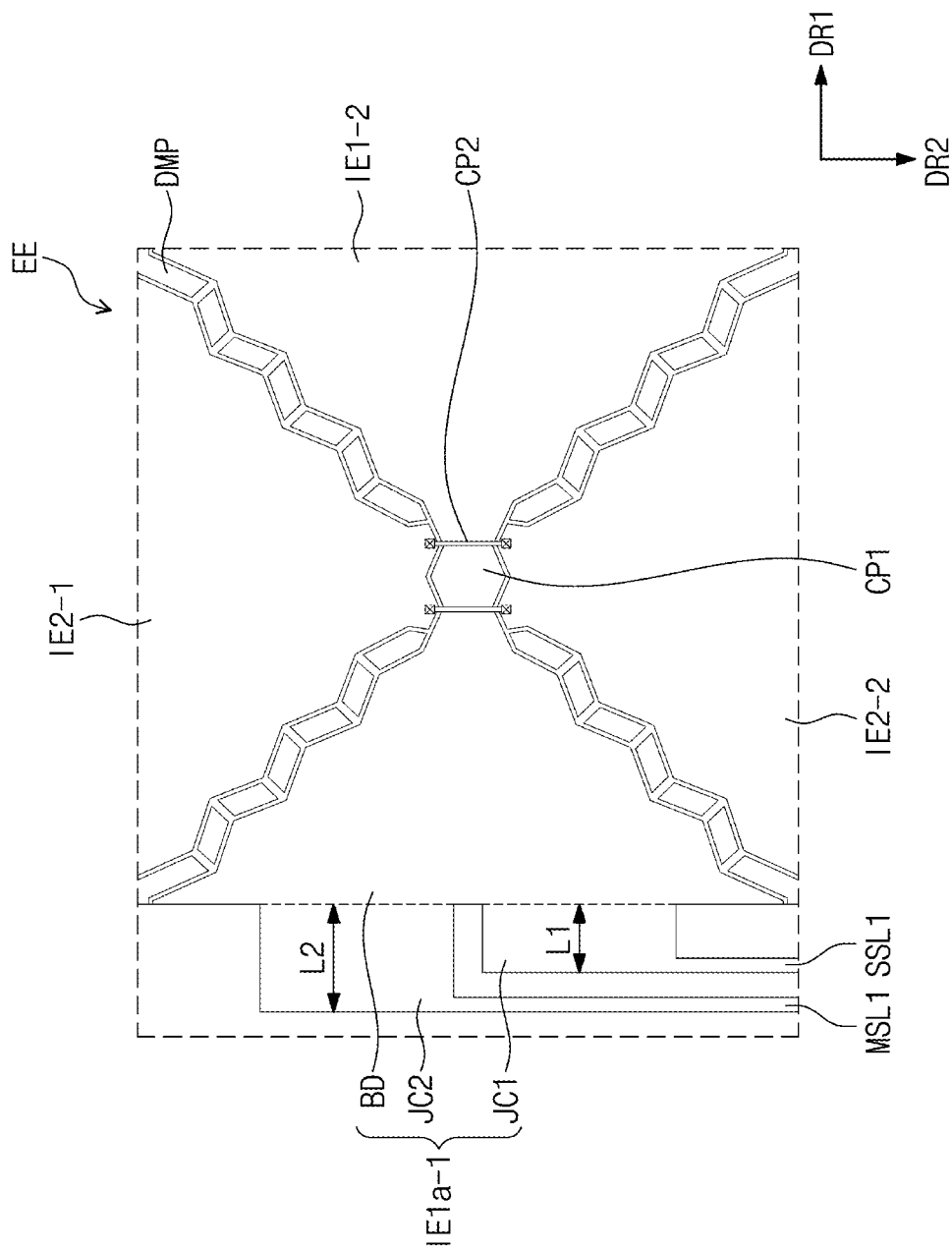
FIG. 9 is an enlarged plan view showing a portion EE of FIG. 7A.

FIG. 9 is an enlarged plan view showing a portion EE of FIG. 7A.

Referring to FIG. 9, a left first sensor IE1a-1 may include a body portion BD, a first junction portion JC1, and a second junction portion JC2.

The body portion BD shown in FIG. 9 may have substantially the same shape as the left first sensor IE1-1 shown in FIG. 7B.

The first junction portion JC1 may be protruded from the body portion BD in a direction substantially parallel to the first direction DR1. The first junction portion JC1 may be connected to the first signal line SSL1.

The second junction portion JC2 may be protruded from the body portion BD in a direction substantially parallel to the first direction DR1. The second junction portion JC2 may be connected to the first measuring line MSL1.

A length L1 (hereinafter, referred to as a "first length") obtained by measuring the first junction portion JC1 in the first direction DR1 may be different from a length L2 (hereinafter, referred to as a "second length") obtained by measuring the second junction portion JC2 in the first direction DR1. In detail, the first length L1 may be shorter than the second length L2.

Descriptions on the other components of the present embodiment are substantially the same as those of FIG. 7B, and thus details thereof will be omitted.

Figure 10:
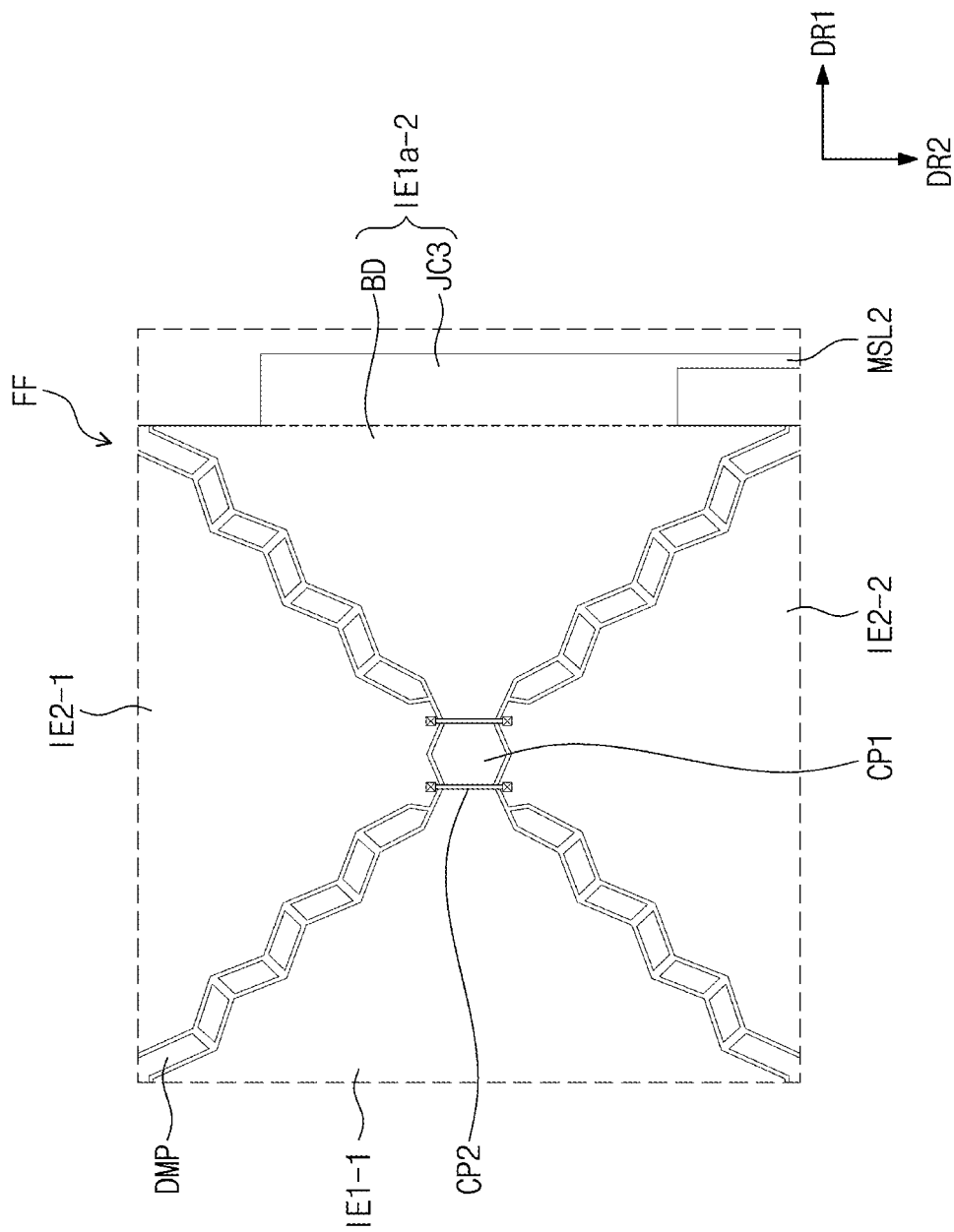
FIG. 10 is an enlarged plan view showing a portion FF of FIG. 7A.

FIG. 10 is an enlarged plan view showing a portion FF of FIG. 7A.

Referring to FIG. 10, a right first sensor IE1a-2 may include a body portion BD and a third junction portion JC3.

The third junction portion JC3 may be protruded from the body portion BD in a direction substantially parallel to the first direction DR1. The third junction portion JC3 may be connected to the second measuring line MSL2.

Descriptions on the other components of the present embodiment are substantially the same as those of FIG. 7B, and thus details thereof will be omitted.

Figure 11:
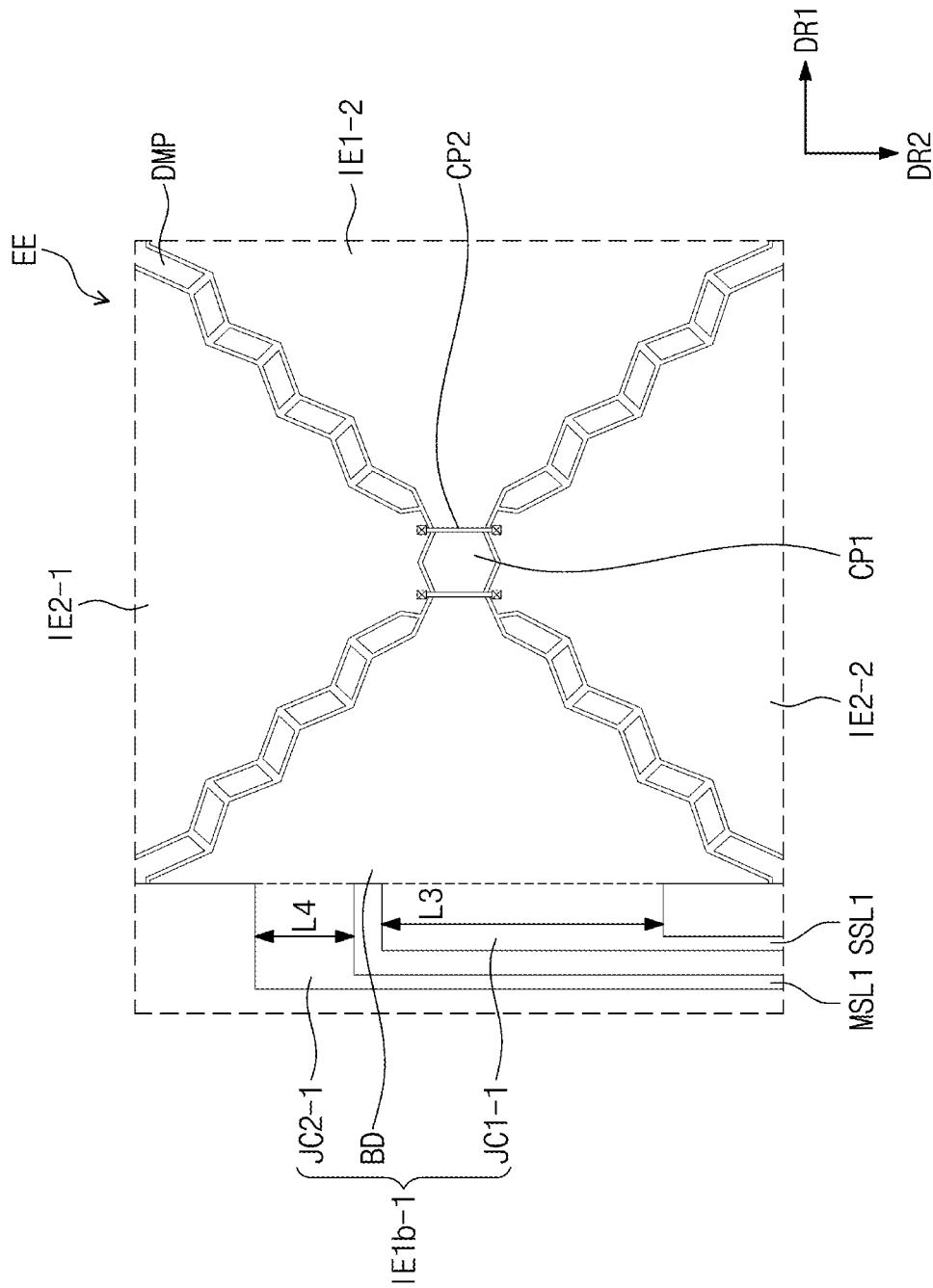
FIG. 11 is an enlarged plan view showing another example of a portion EE of FIG. 7A.

FIG. 11 is an enlarged plan view showing another example of a portion EE of FIG. 7A.

Referring to FIG. 11, a left first sensor IE1b-1 may include a body portion BD, a first junction portion JC1-1, and a second junction portion JC2-1.

A length L3 (hereinafter, referred to as a "third length") obtained by measuring the first junction portion JC1-1 in the second direction DR2 may be different from a length L4 (hereinafter, referred to as a "fourth length") obtained by measuring the second junction portion JC2-1 in the second direction DR2. In detail, the third length L3 may be equal to or greater than the fourth length L4 and equal to or smaller than four times the fourth length L4. When the third length L3 is smaller than the fourth length L4, a contact area between the first junction portion JC1-1 and the first signal line SSL1 may decrease, and as a result, a sensitivity of the input sensing circuit ISC may be lowered. When the third length L3 exceeds four times the fourth length L4, a contact area between the second junction portion JC2-1 and the first measuring line MSL1 may decrease, and as a result, a resistance value of a closed loop formed by the first measuring line MSL1, the first sensors IE1, and the second measuring line MSL2 may become too high.

Figure 12A:
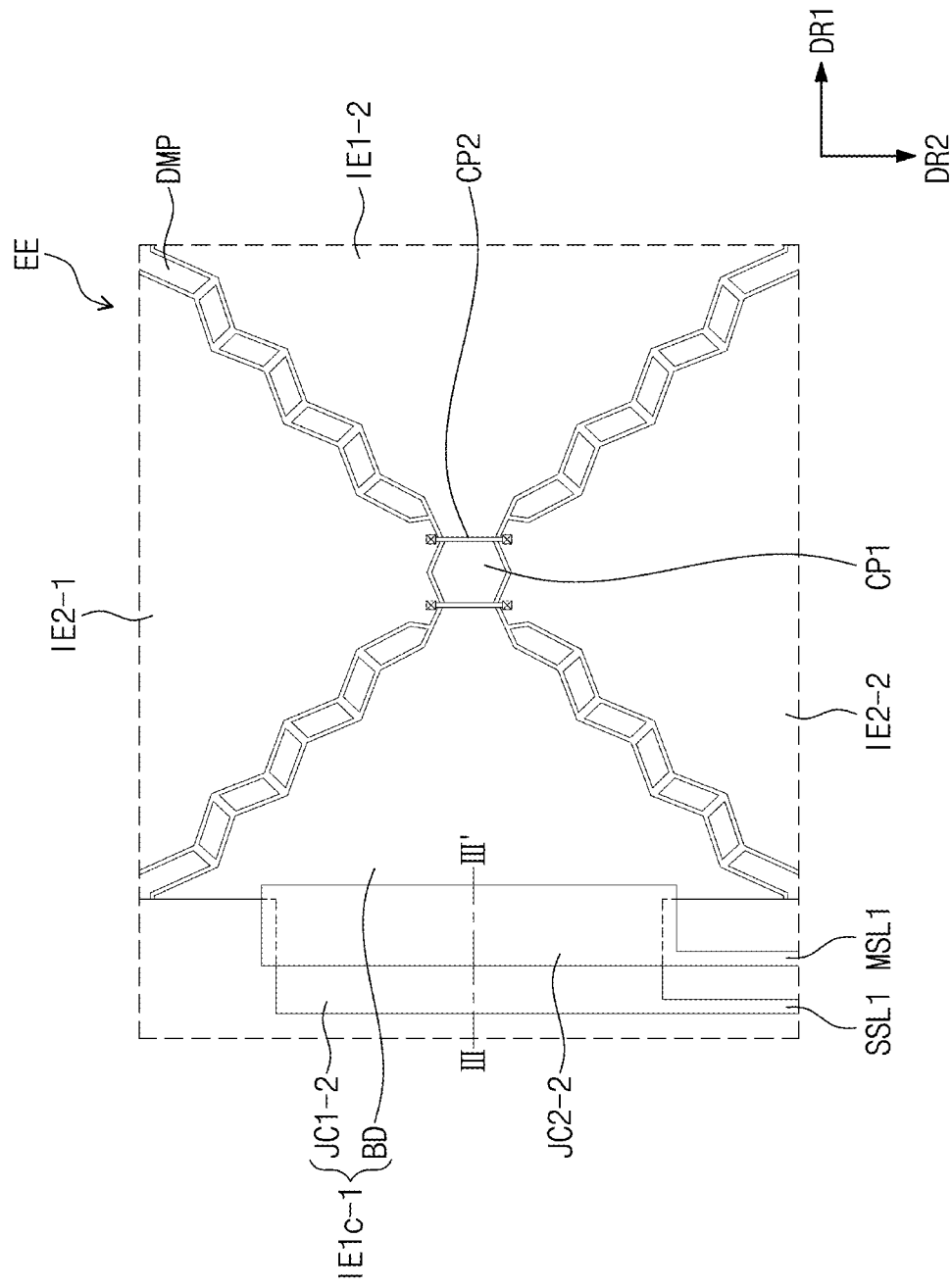
FIG. 12A is an enlarged plan view showing another example of a portion EE of FIG. 7A.
Figure 12B:
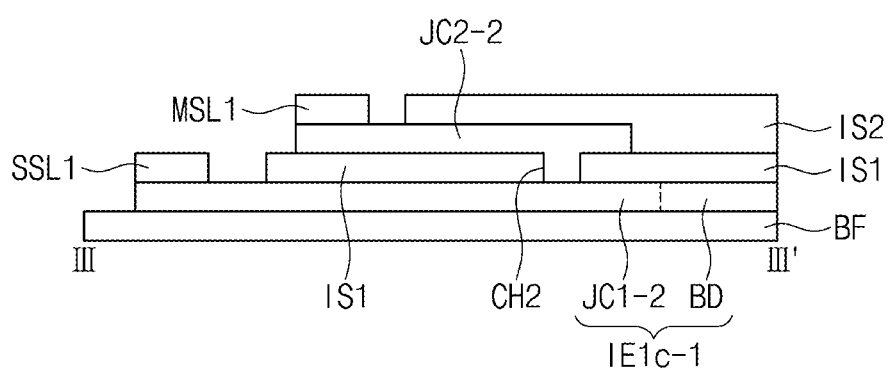
FIG. 12B is a cross-sectional view taken along a sectional line III-III' of FIG. 12A.

FIG. 12A is an enlarged plan view showing another example of a portion EE of FIG. 7A. FIG. 12B is a cross-sectional view taken along a sectional line III-III' of FIG. 12A.

Referring to FIGS. 12A and 12B, a left first sensor IE1c-1 may be disposed on the base film BF. The left first sensor IE1c-1 may include a body portion BD and a first junction portion JC1-2.

The first signal line SSL1 may be disposed on the first junction portion JC1-2.

The first insulating layer IS1 may be disposed on the base film BF. The first insulating layer IS1 may cover at least a portion of the first junction portion JC1-2 and the body portion BD. The first insulating layer IS1 may not cover the first signal line SSL1. The first insulating layer IS1 may be provided with a second contact hole CH2 defined therethrough.

A second junction portion JC2-2 may be disposed on the first insulating layer IS1. The second junction portion JC2-2 may overlap with the first junction portion JC1-2. The second junction portion JC2-2 may be connected to the left first sensor IE1c-1 through the second contact hole CH2.

The first measuring line MSL1 may be disposed on the second junction portion JC2-2.

The second insulating layer IS2 may be disposed on the first insulating layer IS1 and may cover at least a portion of the second junction portion JC2-2. The second insulating layer IS2 may not cover the first measuring line MSL1.

Figure 13:
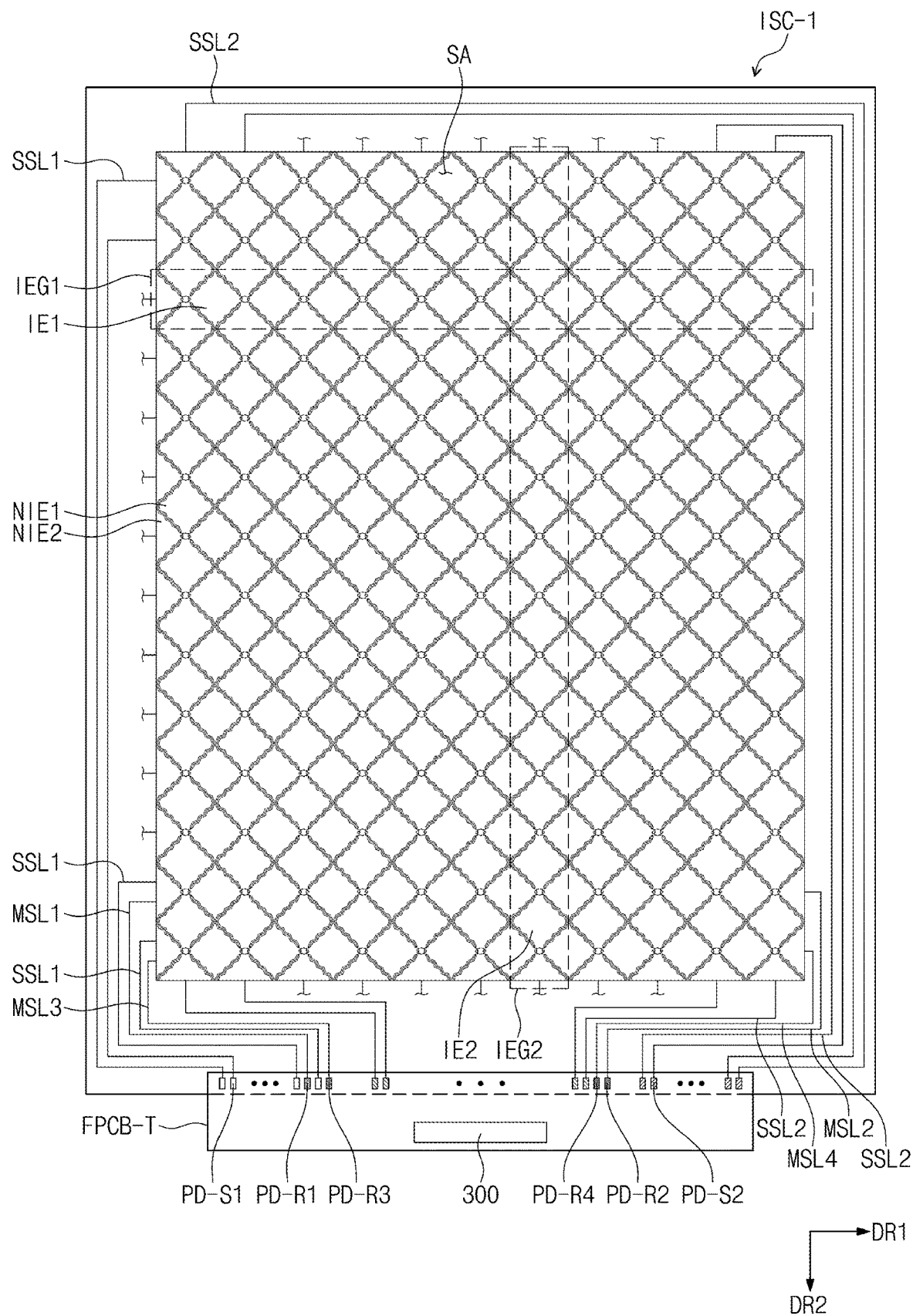
FIG. 13 is a plan view showing an input sensing circuit according to an embodiment of the present disclosure.

FIG. 13 is a plan view showing an input sensing circuit ISC-1 according to an embodiment of the present disclosure.

The input sensing circuit ISC-1 may include first sensor groups IEG1, second sensor groups IEG2, first connection portions CP1, second connection portions CP2, first signal lines SSL1, second signal lines SSL2, a first measuring line MSL1, a second measuring line MSL2, a third measuring line MSL3, a fourth measuring line MSL4, signal pads PD-S1 and PD-S2, sensing pads PD-R1, PD-R2, PD-R3, and PD-R4, a printed circuit board FPCB-T, and input sensing driver 300.

The input sensing circuit ISC-1 shown in FIG. 13 may further include the third measuring line MSL3, the fourth measuring line MSL4, the third sensing pad PD-R3, and the fourth sensing pad PD-R4 when compared with the input sensing circuit ISC shown in FIG. 7A.

A connection structure between one first sensor group IEG1, the third measuring line MSL3, the fourth measuring line MSL4, the third sensing pad PD-R3, and the fourth sensing pad PD-R4 may be substantially the same as a connection structure between another first sensor group IEG1 adjacent to the one first sensor group IEG1, the first measuring line MSL1, the second measuring line MSL2, the first sensing pad PD-R1, and the second sensing pad PD-R2.

The input sensing driver 300 may compare a resistance change value (hereinafter, referred to as a "first resistance change value") of the first sensor group IEG1, which is measured using the first measuring line MSL1, the second measuring line MSL2, the first sensing pad PD-R1, and the second sensing pad PD-R2 with a resistance change value (hereinafter, referred to as a "second resistance change value") of the first sensor group IEG1, which is measured using the third measuring line MSL3, the fourth measuring line MSL4, the third sensing pad PD-R3, and the fourth sensing pad PD-R4.

When the first resistance change value is substantially equal to the second resistance change value, the input sensing driver 300 may determine that the resistance change of the first sensor group IEG1 is due to an external temperature change and the external pressure is not applied.

When a difference between the first resistance change value and the second resistance change value is equal to or greater than a predetermined value (e.g., about 5%), the input sensing driver 300 may determine that the resistance change of the first sensor group IEG1 is due to the pressure applied from the outside.

Figure 14:
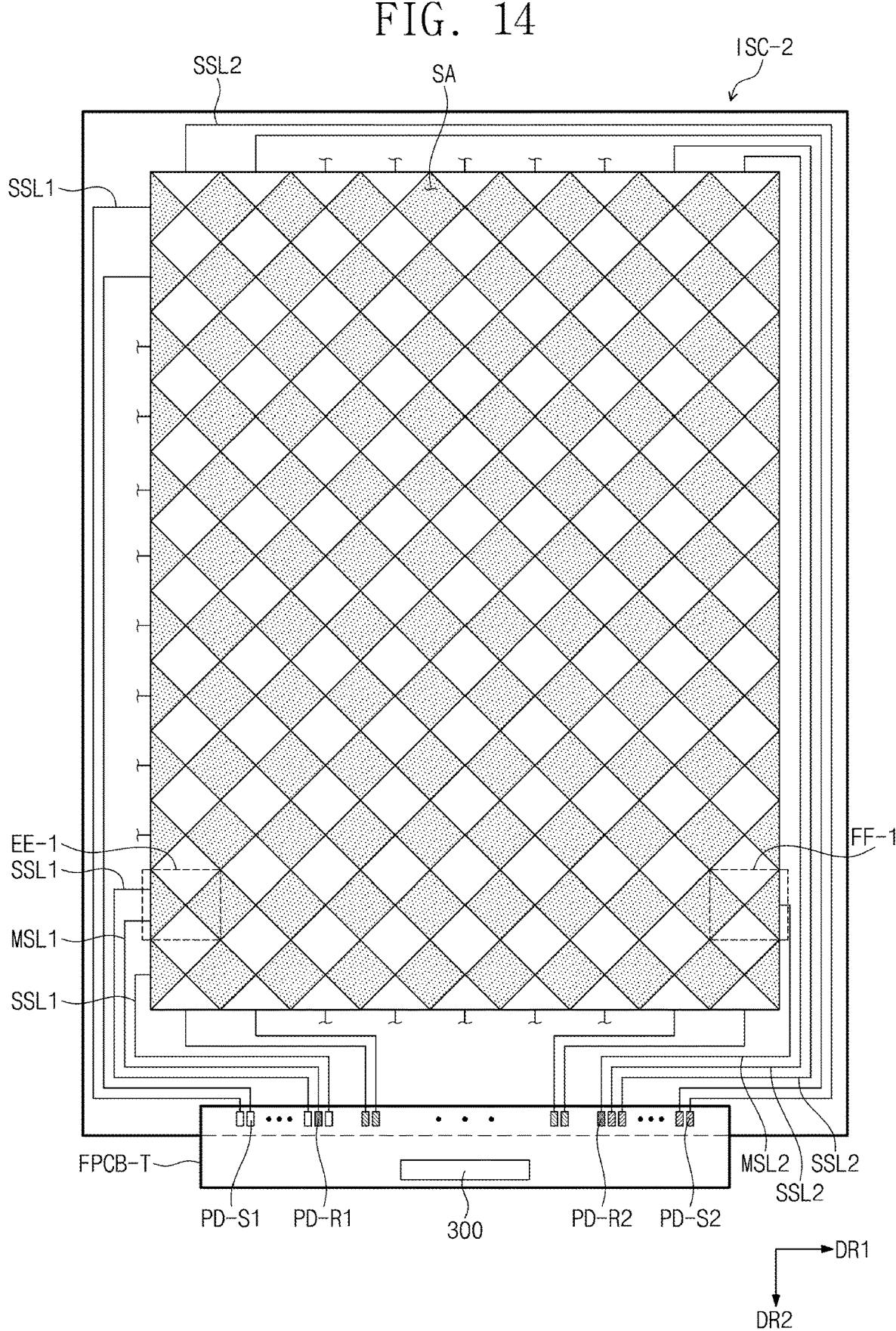
FIG. 14 is a plan view showing an input sensing circuit according to an embodiment of the present disclosure.
Figure 15:
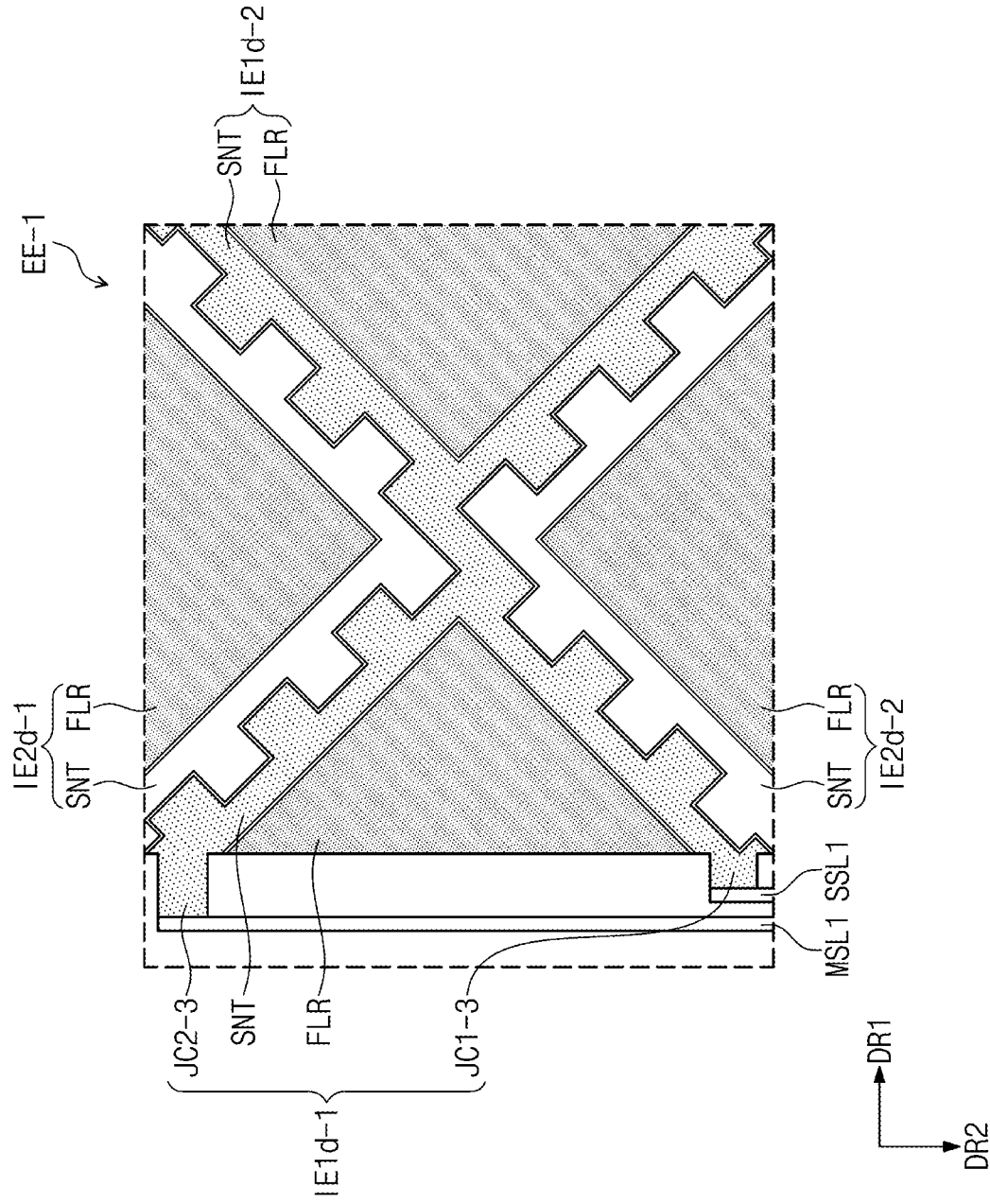
FIG. 15 is an enlarged plan view showing a portion EE-1 of FIG. 14.
Figure 16:
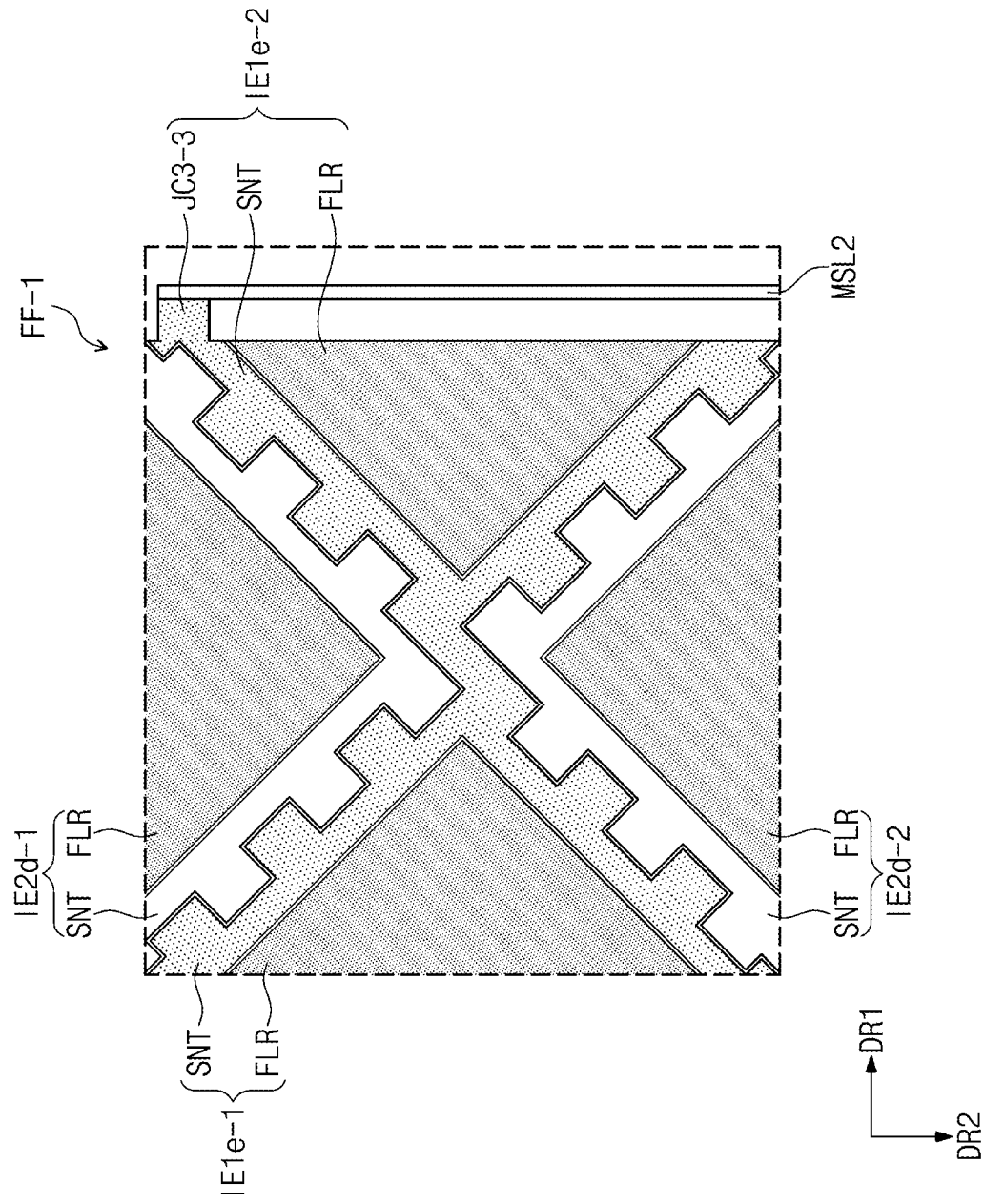
FIG. 16 is an enlarged plan view showing a portion FF-1 of FIG. 14.

FIG. 14 is a plan view showing an input sensing circuit ISC-2 according to an embodiment of the present disclosure. FIG. 15 is an enlarged plan view showing a portion EE-1 of FIG. 14. FIG. 16 is an enlarged plan view showing a portion FF-1 of FIG. 14.

Referring to FIG. 15, a left first sensor IE1*d*-1 may include an active sensor portion SNT, a floating portion FLR, a first junction portion JC1-3, and a second junction portion JC2-3.

Each of a right first sensor IE1*d*-2, an upper second sensor IE2*d*-1, and a lower second sensor IE2*d*-2 may include the active sensor portion SNT and the floating portion FLR.

The floating portion FLR may be disposed to be spaced apart from the active sensor portion SNT. The floating portion FLR may be in an electrically floating state.

Each of the active sensor portions SNT may be electrically connected to a corresponding another active sensor portion SNT and may transmit and receive electrical signals to sense the user's touch or the external pressure.

The first junction portion JC1-3 may be protruded from one end of the active sensor portion SNT in a direction substantially parallel to the first direction DR1. The first junction portion JC1-3 may be connected to the first signal line SSL1.

The second junction portion JC2-3 may be protruded from the other end of the active sensor portion SNT in the direction substantially parallel to the first direction DR1. The second junction portion JC2-3 may be connected to the first measuring line MSL1.

Referring to FIG. 16, a right first sensor IE1*e*-2 may include an active sensor portion SNT, a floating portion FLR, and a third junction portion JC3-3.

Each of a left first sensor IE1*e*-1, an upper second sensor IE2*d*-1, and a lower second sensor IE2*d*-2 may include the active sensor portion SNT and the floating portion FLR.

The third junction portion JC3-3 may be protruded from one end of the active sensor portion SNT in a direction substantially parallel to the first direction DR1. The third junction portion JC3-3 may be connected to the first measuring line MSL1.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display module comprising:
a display panel; and
an input sensing circuit disposed on the display panel, the input sensing circuit comprising:
a first sensor group comprising a plurality of first sensors arranged in a first direction wherein the first sensor group comprises a first raw-first sensor group and a second raw-first sensor group disposed on the first raw-first sensor group in a second direction intersecting the first direction, and being adjacent to the first raw-first sensor group;
a plurality of first connection portions electrically connecting two adjacent first sensors of the plurality of first sensors, respectively;
a second sensor group comprising a plurality of second sensors arranged in the second direction;
a plurality of second connection portions electrically connecting two adjacent second sensors of the plurality of second sensors, respectively;
a first signal line electrically connected to one first sensor among the plurality of first sensors of the second raw-first sensor group;
a first measuring line electrically connected to the one first sensor among the plurality of first sensors of the second raw-first sensor group and spaced apart from the first signal line;
a second measuring line electrically connected to another first sensor among the plurality of first sensors of the second raw-first sensor group;
a third measuring line electrically connected to one first sensor among the plurality of first sensors of the first raw-first sensor group;
a fourth measuring line electrically connected to another first sensor among the plurality of first sensors of the first raw-first sensor group; and
an input sensing driver electrically connected to the first signal line, the first measuring line, the second measuring line, the third measuring line, and the fourth measuring line;
wherein the input sensing driver is configured to sense a first resistance change value of the first measuring line, the plurality of first sensors of the second raw-first sensor group, and the second measuring line during a first period,
wherein the input sensing driver is configured to sense a second resistance change value of the third measuring line, the plurality of first sensors of the first raw-first sensor group, and the fourth measuring line during a first period,
wherein the input sensing driver is configured to sense a capacitance value formed by the plurality of first sensors and the plurality of second sensors during a second period, the second period being different from the first period,
wherein the input sensing circuit comprises a base film, a plurality of first conductive patterns disposed on the base film, a first insulating layer on the plurality of first conductive patterns, a plurality of second conductive patterns disposed on the first insulating layer, and a second insulating layer on the plurality of second conductive patterns, and
wherein each of the first sensors, the second sensors, and the plurality of first connection portions comprises at least of the plurality of first conductive patterns, and the plurality of second connection portions comprises at least of the plurality of second conductive patterns.

2. The display module of claim 1, wherein the one first sensor among the plurality of first sensors comprises:
a body portion;
a first junction portion protruded from the body portion in a direction substantially parallel to the first direction and connected to the first signal line; and
a second junction portion protruded from the body portion in the direction substantially parallel to the first direction and connected to the first measuring line.

3. The display module of claim 2, wherein a first length of the first junction portion in the first direction is different from a second length of the second junction portion in the first direction.

4. The display module of claim 3, wherein the second length is longer than the first length.

5. The display module of claim 2, wherein a third length of the first junction portion in the second direction is equal to or greater than a fourth length of the second junction portion in the second direction and equal to or smaller than four times the fourth length.

6. The display module of claim 1, wherein the input sensing circuit further comprises an insulating layer that covers the plurality of first sensors, the plurality of second sensors, and the first connection portions, at least a portion of each of the second connection portions is disposed on the insulating layer, and the one first sensor of the plurality of first sensors comprises a body portion and a first junction portion protruded from the body portion in the first direction and connected to the first signal line.

7. The display module of claim 6, wherein the input sensing circuit further comprises a second junction portion disposed on the insulating layer, overlapped with the first junction portion, and connected to the one first sensor of the plurality of first sensors and the first measuring line.

8. The display module of claim 7, wherein a plurality of first contact holes and a second contact hole are defined through the insulating layer, the second connection portions are connected to the plurality of second sensors through the first contact holes, and the second junction portion is connected to the one first sensor of the plurality of first sensors through the second contact hole.

9. The display module of claim 1, wherein the input sensing circuit further comprises a second signal line electrically connected to one second sensor among the plurality of second sensors.

10. The display module of claim 1, wherein the input sensing driver is configured to compare the first resistance change value with the second resistance change value.

11. The display module of claim 1, further comprising an adhesive member disposed between the display panel and the input sensing circuit, the adhesive member having a predetermined elasticity.

12. The display module of claim 1, wherein the one first sensor among the plurality of first sensors of the second raw-first sensor group is disposed at one distal end of the first sensor group in the first direction, and the another first sensor among the plurality of first sensors of the second raw-first sensor group is disposed at an opposing distal end of the first sensor group in the first direction.

13. The display module of claim 1, wherein the one first sensor among the plurality of first sensors of the first raw-first sensor group is disposed at one distal end of the first raw-first sensor group in the first direction, and the another first sensor among the plurality of first sensors of the first raw-first sensor group is disposed at an opposing distal end of the first raw-first sensor group in the first direction.

* * * * *